United States Patent
Bao et al.

(10) Patent No.: US 12,491,444 B2
(45) Date of Patent: Dec. 9, 2025

(54) GAME DATA PROCESSING METHOD AND APPARATUS, AND STORAGE MEDIUM FOR AUDIO-VIDEO SYNCHRONIZATION IN DATA TRANSMISSION

(71) Applicant: Tencent Technology (Shenzhen) Company Limited, Shenzhen (CN)

(72) Inventors: Zenghui Bao, Shenzhen (CN); Zhipeng Gong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 280 days.

(21) Appl. No.: 18/135,562

(22) Filed: Apr. 17, 2023

(65) Prior Publication Data
US 2023/0256345 A1    Aug. 17, 2023

Related U.S. Application Data

(63) Continuation of application No. PCT/CN2022/109392, filed on Aug. 1, 2022.

(30) Foreign Application Priority Data

Aug. 24, 2021    (CN) .......................... 202110974053.3

(51) Int. Cl.
    *A63F 13/86*      (2014.01)
    *A63F 13/355*     (2014.01)
    *A63F 13/71*      (2014.01)
(52) U.S. Cl.
    CPC ............ *A63F 13/71* (2014.09); *A63F 13/355* (2014.09); *A63F 13/86* (2014.09)

(58) Field of Classification Search
CPC ...................................................... A63F 13/86
See application file for complete search history.

(56) References Cited

U.S. PATENT DOCUMENTS 10,653,967 B2    5/2020   Ninoles et al.
10,737,183 B1 *   8/2020   Sharma ................. A63F 13/352
(Continued)

FOREIGN PATENT DOCUMENTS

CN     104967960 A    10/2015
CN     110034828 A     7/2019
(Continued)

OTHER PUBLICATIONS

Translation of CN111314724A (Year: 2020).*
(Continued)

*Primary Examiner* — Jay Trent Liddle
(74) *Attorney, Agent, or Firm* — Morgan, Lewis & Bockius LLP

(57) ABSTRACT

This application discloses a game data processing method performed by a computer device. The method includes: establishing a livestreaming service connection between a cloud server and a livestreaming server associated with a target cloud gaming; acquiring game image data and game audio data of the target cloud gaming based on the livestreaming service connection; acquiring audio data of a livestreamer object transmitted by a cloud gaming client of the target cloud gaming; mixing the game audio data and the audio data to obtain mixed audio data; obtaining a livestreaming data stream corresponding to the target cloud gaming based on the mixed audio data; and delivering the livestreaming data stream to a livestreaming client associated with the cloud gaming client through the livestreaming server.

18 Claims, 11 Drawing Sheets

(56) References Cited

U.S. PATENT DOCUMENTS

| | | | |
|---|---|---|---|
| 10,897,637 B1* | 1/2021 | Pham | H04N 21/23406 |
| 2013/0137511 A1 | 5/2013 | Bae et al. | |
| 2019/0104165 A1* | 4/2019 | Åkerfeldt | H04N 21/21805 |
| 2019/0262727 A1* | 8/2019 | Trombetta | A63F 13/5255 |
| 2019/0282898 A1 | 9/2019 | Perry | |
| 2020/0120363 A1 | 4/2020 | De Decker et al. | |
| 2020/0162796 A1 | 5/2020 | Azuolas et al. | |
| 2021/0052988 A1* | 2/2021 | Fear | H04N 21/25875 |
| 2021/0154575 A1* | 5/2021 | Behara | H04N 21/2385 |

FOREIGN PATENT DOCUMENTS

| | | | |
|---|---|---|---|
| CN | 110393921 A | | 11/2019 |
| CN | 111314724 A | | 6/2020 |
| CN | 111729293 A | | 10/2020 |
| CN | 112423095 A | | 2/2021 |
| CN | 112473133 A | | 3/2021 |
| CN | 112870711 A | | 6/2021 |
| CN | 113423018 A | | 9/2021 |
| EP | 4122568 A1 | | 6/2021 |
| WO | WO 2018213481 A1 | | 11/2018 |
| WO | WO 2020188532 A1 | | 9/2020 |

OTHER PUBLICATIONS

Tencent Technology, ISR, PCT/CN2022/109392, Oct. 21, 2022, 2 pgs.

Tencent Technology, Extended European Search Report, EP Patent Application No. 22860180.3, Jul. 17, 2024, 14 pgs.

Lourdes Beloqui Yuste et al., "Understanding Timelines Within MPEG Standards", IEEE Communications Surveys & Tutorials, vol. 18, No. 1, DOI: 10.1109/COMST.2015.2488483, Dec. 2015, 33 pgs.

Tencent Technology, WO, PCT/CN2022/109392, Oct. 21, 2022, 5 pgs.

Tencent Technology, IPRP, PCT/CN2022/109392, Feb. 27, 2027, 6 pgs.

Tencent Technology, Japanese Office Action, JP Patent Application No. 2023-571192, Jan. 29, 2025, 10 pgs.

* cited by examiner

GAME DATA PROCESSING METHOD AND APPARATUS, AND STORAGE MEDIUM FOR AUDIO-VIDEO SYNCHRONIZATION IN DATA TRANSMISSION

CROSS-REFERENCE TO RELATED APPLICATIONS

This application is a continuation application of PCT Patent Application No. PCT/CN2022/109392, entitled "GAME DATA PROCESSING METHOD AND APPARATUS, AND STORAGE MEDIUM" filed on Aug. 1, 2022, which claims priority to Chinese Patent Application No. 202110974053.3, entitled "GAME DATA PROCESSING METHOD AND APPARATUS, AND STORAGE MEDIUM" filed with the Patent Office of China on Aug. 24, 2021, which is incorporated herein by reference in its entirety.

FIELD OF THE TECHNOLOGY

This application relates to the field of computer computing, and in particular to a game data processing method and apparatus, and a storage medium.

BACKGROUND OF THE DISCLOSURE

At present, in the traditional game livestreaming scene, a livestreamer user can operate and run a two-dimensional game (i.e. 2D game) on a mobile terminal, and can livestream and record the currently running 2D game live through the mobile terminal, so that the audio/video stream recorded by the mobile terminal in real time can be pushed as the livestream.

Apparently, in the traditional game livestreaming scene, the audio/video streams recorded in real time are all obtained at the mobile terminal side, so that it relies on the performance of the mobile terminal used by the livestreamer user to directly push the coded livestream to the remote livestream. In the traditional game livestreaming scene, the traditional 2D game and cloud gaming have different performance requirements for the mobile terminals, it is impossible to livestream cloud gaming directly depending on the traditional game livestreaming manner. Therefore, in a cloud gaming livestreaming scene, how to realize audio-video synchronization in data transmission between different terminals is an urgent technical problem.

SUMMARY

According to various embodiments provided by this application, a game data processing method and apparatus, and a storage medium are provided.

In one aspect, this application provides a game data processing method, performed by a computer device. The method includes:

establishing a livestreaming service connection between a cloud server and a livestreaming server associated with a target cloud gaming;

acquiring game image data and game audio data of the target cloud gaming based on the livestreaming service connection, and an image collection timestamp corresponding to the game image data and an audio collection timestamp corresponding to the game audio data;

acquiring audio data of a livestreamer object transmitted by a cloud gaming client of the target cloud gaming;

mixing the game audio data and the audio data to obtain mixed audio data, a mixing timestamp corresponding to the mixed audio data being consistent with the audio collection timestamp;

obtaining a livestreaming data stream corresponding to the target cloud gaming based on the mixed audio data, the audio collection timestamp, the game image data and the image collection timestamp; and delivering the livestreaming data stream to a livestreaming client associated with the cloud gaming client through the livestreaming server.

In another aspect, this application provides a computer device, including a memory and one or more processors. The memory stores computer-readable instructions, and the computer-readable instructions, when executed by the processor, cause the computer device to execute the steps in the game data processing method described above.

This application provides one or more non-transitory computer-readable storage media storing computer-readable instructions. The computer-readable instructions, when executed by one or more processors of a computer device, cause the computer device to implement the steps in the game data processing method described above.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe the technical solutions in the embodiments of this application or in the related art more clearly, the following briefly introduces the accompanying drawings for describing the embodiments or the related art. Apparently, the accompanying drawings in the following description show merely some embodiments of this application, and a person of ordinary skill in the art may still derive other drawings from the accompanying drawings without creative efforts.

DESCRIPTION OF EMBODIMENTS

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

Embodiments of this application relate to cloud technology, cloud computing and cloud gaming. Cloud gaming, also known as gaming on demand, is an online gaming technology based on cloud computing technology. Cloud gaming enables a thin client with relatively limited graphics processing and data computing abilities to run high-quality games. In a cloud gaming scene, the game is run not in a player game terminal (which may also be referred to as the game terminal corresponding to the game object), but in a cloud server, and the cloud server renders the game scene into a video and audio stream (i.e. audio/video stream) and transmits it to the player game terminal through the network. For example, in the embodiments of this application, the rendering used by the cloud server belongs to an in-container rendering technology. The container here refers to a cloud virtual container virtually obtained in the cloud server, that is, the video and audio streams obtained by rendering in the cloud virtual container can be transmitted to the player game terminal through the network according to the embodiments of this application. Here, the player game terminal does not need to have powerful graphics computing and data, processing abilities, but only needs to have basic streaming media playing abilities and the ability to acquire input instructions from the player (i.e., game user) and transmit the input instructions to the cloud server.

In a cloud gaming scene, the player (i.e., the aforementioned game object) may perform data interchange between the gaming client run in the player game terminal and the cloud server. In this way, the cloud server may, after completing the rendering operation of game data, in the gaming client in a cloud virtual container in the cloud, further perform a coding operation on the game picture and audio obtained by rendering, so that the coded audio/video stream can be delivered to the player game terminal for a decoding operation. The audio/video stream may include at least one of an audio stream or a video stream.

Figure 1:
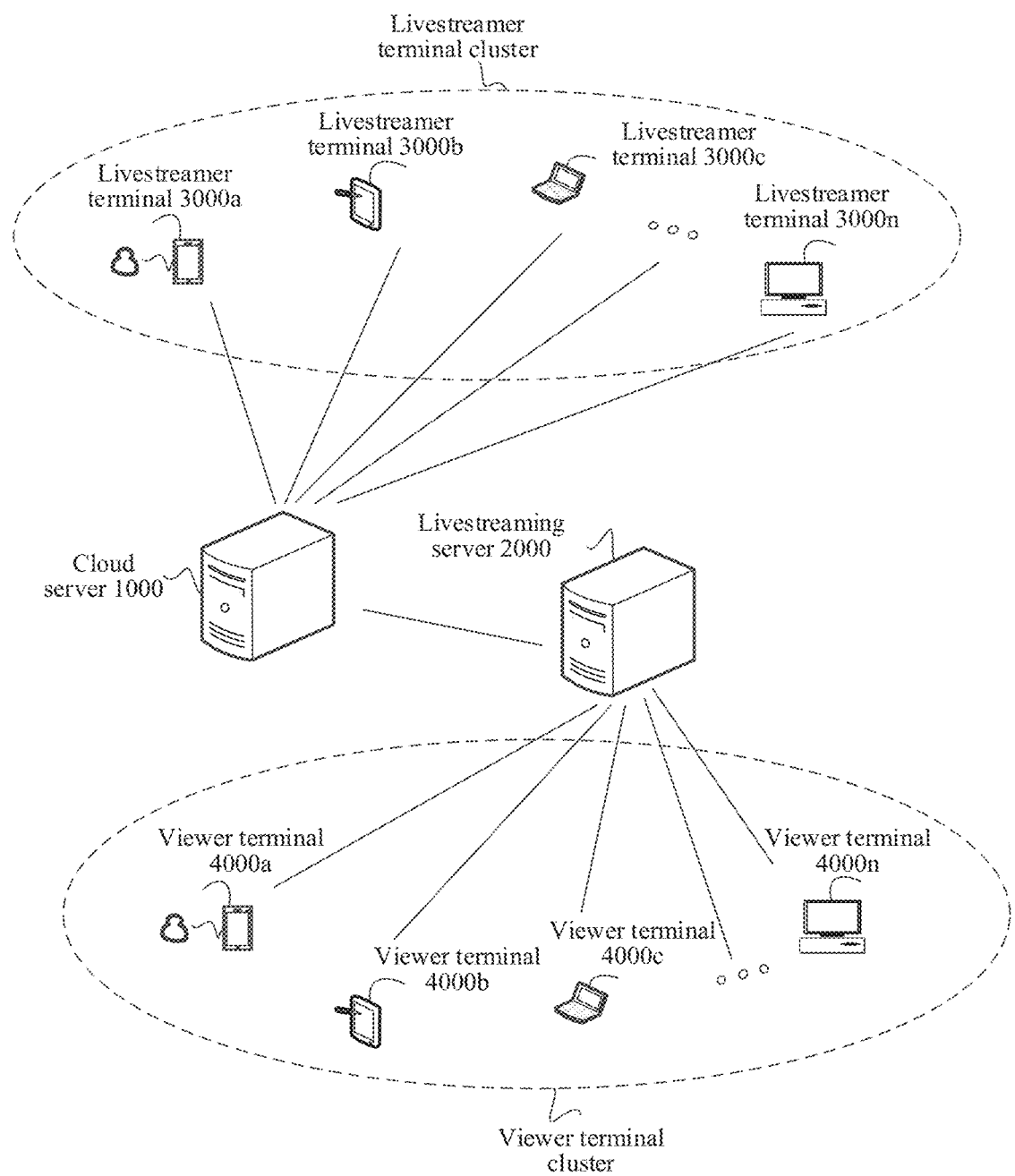
FIG. 1 is a schematic structural diagram of a network architecture according to an embodiment of this application.

FIG. 1 is a schematic structural diagram of a network architecture according to an embodiment of this application. As shown in FIG. 1, the network architecture may be applied to a data processing system in a cloud gaming livestreaming scene. The data processing system may specifically include a cloud server 1000, a livestreamer terminal cluster, a livestreaming server 2000 and a viewer terminal cluster shown in FIG. 1. The livestreamer terminal cluster may specifically include one or a plurality of livestreamer terminals. The plurality means at least two. The livestreamer terminal may be the above-mentioned player game terminal with a livestreaming function. As shown in FIG. 1, the plurality of livestreamer terminals may specifically include a livestreamer terminal 3000a, a livestreamer terminal 3000b, a livestreamer terminal 3000c, and a livestreamer terminal 3000n. As shown in FIG. L the livestreamer terminal 3000a, the livestreamer terminal 3000b, the livestreamer terminal 3000c, . . . , and the livestreamer terminal 3000n may respectively perform a network connection with the cloud server 1000, so that each livestreamer terminal may perform data interchange with the cloud server 1000 through the network connection.

When a certain livestreamer terminal runs a cloud gaming client with a livestreaming function and the game object uses this cloud gaming client to perform interaction on a certain cloud gaming (i.e., target cloud gaming), the game picture of the target cloud gaming may be rendered at the cloud server 1000 side, and the rendered game picture may be compressed, so that the coded game video stream can be used as a game coded stream to be returned to the livestreamer terminal. The game object is, for example, a game user. The compressing is, for example, coding.

If a game object transmits a cloud gaming livestreaming request for the target cloud gaming to the cloud server 1000 through a cloud gaming client with a livestreaming function, the game objects currently accessing the cloud gaming clients may be collectively referred to as livestreamer objects, and a livestreaming service connection may be established between the cloud server 1000 side and the livestreaming server 2000 based on the cloud gaming livestreaming request, so that cloud stream pushing can be realized in the cloud through the livestreaming service connection. As shown in FIG. 1, the cloud server 1000 may push the livestreaming data stream coded in the cloud to the livestreaming server 2000, so that the livestreaming server 2000 may decode the received livestreaming data stream. Further, an audio/video sequence corresponding to the decoded livestreaming data stream can be cached, so that a transcoded video stream coded by the livestreaming server 2000 can be delivered to a viewer terminal corresponding to a player in the virtual livestreaming room subsequently. For different viewer terminals, the transcoded video stream is determined by the livestreaming server 2000 based on terminal screen information of different viewer terminals in the virtual livestreaming room. The terminal screen information includes, but not limited to, at least one of size or resolution of the terminal screen. The livestreaming server 2000 may perform adaptation processing on the decoded audio/video sequence according to the terminal screen information of different viewer terminals and further deliver the transcoded video streams obtained by adaptation processing to the viewer terminals, so that the viewer terminals can decode the received transcoded video streams and then display cloud gaming livestreaming pictures with different sizes or different resolutions on livestreaming display interfaces. The audio/video sequence includes, but not limited to, an audio/video sequence that has been mixed at the cloud server 1000 side.

The viewer terminal cluster may specifically include one or a plurality of viewer terminals. The plurality means at least two. As shown in FIG. 1, the plurality of viewer terminals may specifically include a viewer terminal 4000a, a viewer terminal 4000b, a viewer terminal 4000c, . . . , and a viewer terminal 4000n. As shown in FIG. 1, the viewer terminal 4000a, the viewer terminal 4000b, the viewer terminal 4000c, . . . , and the viewer terminal 4000n may respectively perform a network connection with the livestreaming server 2000, so that each viewer terminal can perform data interchange with the livestreaming server 2000 through the network connection when running a viewer client. For example, when these viewer terminals request to play a live video of the target cloud gaming currently being livestreamed by the livestreamer object, they may pull the transcoded video stream of the target cloud gaming currently being livestreamed by the livestreamer object from the livestreaming server 2000. The viewer client here is the livestreaming client run by the viewer terminal.

The cloud server 1000 and the livestreaming server 2000 shown in FIG. 1 each may be an independent physical server, or a server cluster or distributed system including a plurality of physical servers, or a cloud server that provides basic cloud computing services such as cloud services, cloud databases, cloud computing, cloud functions, cloud storage, network services, cloud communication, middleware services, domain name services, security services, CDN, and big data or artificial intelligence platforms.

For the convenience of understanding, according to this embodiment of this application, a livestreamer terminal may be selected from the livestreamer terminal cluster shown in FIG. 1 as a target livestreamer terminal. For example, according to this embodiment of this application, the livestreamer terminal 3000a shown in FIG. 1 may be used as the target livestreamer terminal, which may be integrated with a cloud gaming client with a game data livestreaming function. The cloud gaming client is integrated with one or more cloud, gamings, which may include, but not limited to, at least one of competitive cloud gamings, parkour cloud gamings, chess and card cloud gamings or shooter cloud gamings.

The target livestreamer terminal may specifically include: a smart phone, a tablet computer, a notebook computer, a desktop computer, a wearable device, a smart home appliance and other smart terminals with a video data processing function. The smart home appliance includes a smart TV, and the video data processing function includes a video data playing function.

Figure 2:
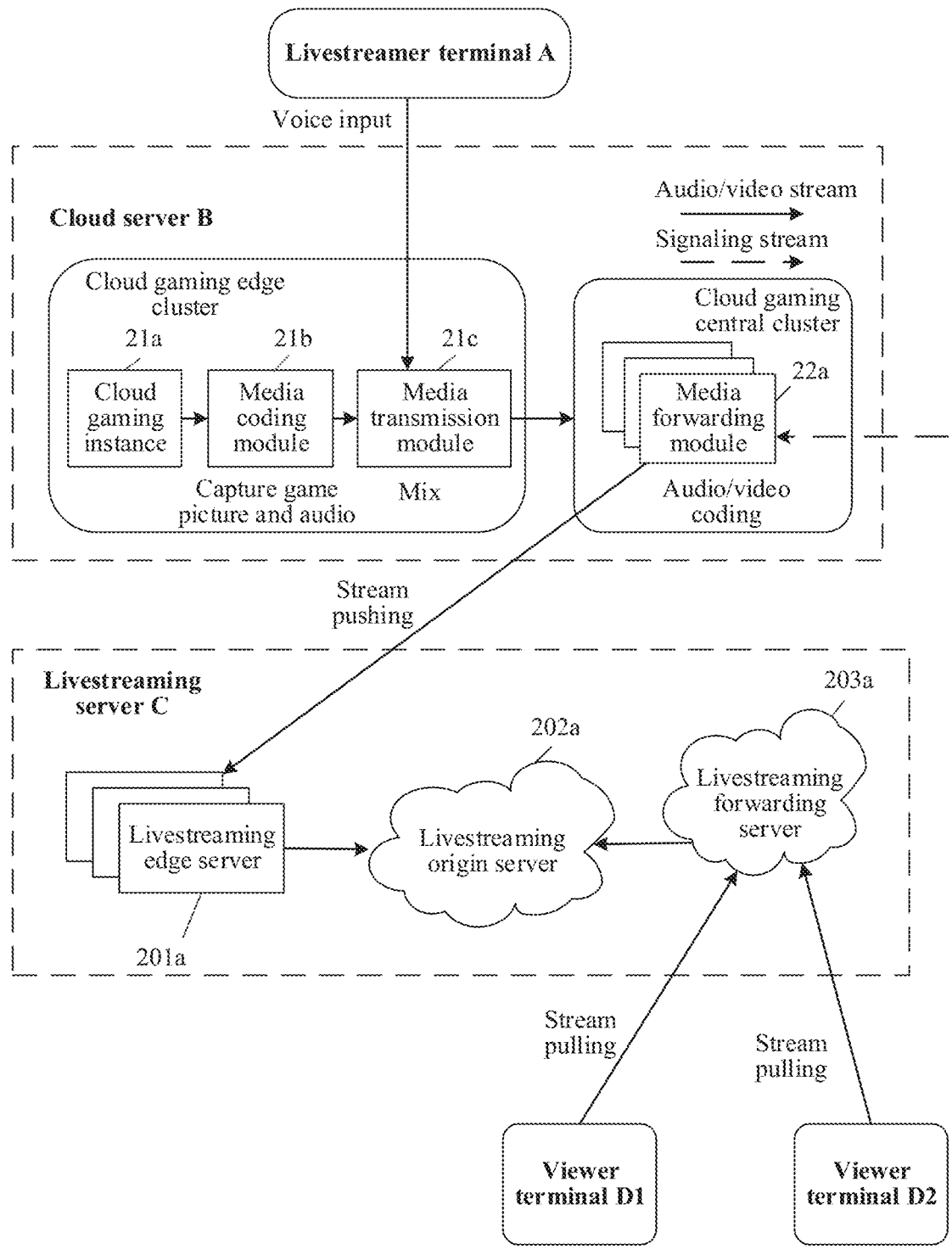
FIG. 2 is a schematic diagram showing a livestream pushing scene in a cloud gaming scene according to an embodiment of this application.

FIG. 2 is a schematic diagram showing a livestream pushing scene in a cloud gaming scene according to an embodiment of this application. For the convenience of understanding, taking a livestreamer terminal A shown in FIG. 2 being the target livestreamer terminal as an example, a process of the livestreamer terminal A performing data interchange with a cloud server B will be described. The livestreamer terminal A runs a cloud gaming client with a livestreaming function. As shown in FIG. 2, when a certain game object needs to play cloud gamings through the livestreamer terminal A, the livestreamer terminal A may output, in response to a trigger operation of the game object for the cloud gaming client, a game display interface including N cloud gamings on the livestreamer terminal A. Here, N is a positive integer. The game object may select the cloud gaming of interest from the N cloud gamings displayed on the game display interface as the target cloud gaming, and the livestreamer terminal A may transmit, in response to a trigger operation for the target cloud gaming among the N cloud gamings, a game access request for the target cloud gaming to the cloud server B. The game object is, for example, User U1.

The cloud server B may be a cloud server 1000 in the embodiment corresponding to FIG. 1. As shown in FIG. 2, the cloud server B may include at least one of a cloud gaming edge cluster for providing cloud gaming services or a cloud gaming central cluster for providing cloud stream pushing services as shown in FIG. 2.

The cloud gaming edge cluster may include one or a plurality of cloud gaming edge servers. The plurality means at least two. In an example where the cloud gaming edge cluster includes one cloud gaming edge server, the cloud gaming edge server may include, but not limited to, a plurality of cloud service modules shown in FIG. 2. The plurality of cloud service modules may specifically include a cloud gaming instance module 21a, a media coding module 21b and a media transmission module 21c. One cloud service module in the cloud gaming edge server may be configured to run one process of the cloud server B shown in FIG. 2.

The game process provided by the cloud gaming instance module 21a may be used for running a game instance of the target cloud gaming in the cloud, and the game process corresponding to the game instance is run in a cloud virtual container configured by the cloud server B for a client environment system of the livestreamer terminal A. The cloud gaming instance run in the cloud virtual container is a game mode based on cloud computing. In a cloud gaming running mode, all the games are run at the cloud server B, and the rendered game pictures can be compressed and transmitted to User U1 through the network. For example, the cloud gaming client run on the livestreamer terminal A may detect a trigger event of the user in real lime, such as at least one of a touch screen event, a keyboard and mouse event or a joystick events, etc., and then transmit the detected corresponding trigger event to the cloud server B shown in FIG. 2 through the network, so as to run the cloud gaming instance by remotely operating the game process in the cloud virtual container. The cloud gaming instance run in the cloud virtual container refers to a game instance corresponding to the target cloud gaming.

The media coding process provided by the media coding module 21b can be used for capturing a game picture and audio of the cloud gaming instance run by the cloud gaming instance module 21a, performing audio/video coding on the captured game picture and audio, and transmitting an audio/video stream obtained after audio/video coding to the media transmission module 21c shown in FIG. 2. The cloud gaming instance is, for example, a game instance corresponding to the game process. For example, the cloud gaming instance may be an Android instance.

In this embodiment of this application, the media coding process corresponding to the media coding module 21b and the game process corresponding to the cloud gaming instance module 21a may be run in the same cloud virtual container. That is, in this embodiment of this application, in-container data rendering can be performed in the cloud virtual container running the cloud gaming instance, so that rendering delay during game picture rendering can be reduced fundamentally. Besides, the media coding module 21b may also receive a voice input operation, a touch operation or the like transmitted by User U1 through the livestreamer terminal A and forwarded by the media transmission module 21c shown in FIG. 2, and inject the received voice input operation, touch operation or the like into the cloud gaming instance.

In an example where the operation forwarded by the media transmission module 21c is a touch operation executed by User U1 through the livestreamer terminal A, when the media coding module 21b shown in FIG. 2 injects the touch operation into the cloud gaming instance in the cloud gaming instance module 21a at a moment T1, the media coding module 21b may also be configured to capture the game picture and audio at the next moment of the moment T1 when the cloud gaming instance responses the touch operation. In this embodiment of this application, the game pictures periodically captured by the media coding module 21b may be collectively referred to as game image data, and the audio periodically captured by the media coding module 21*b* may be collectively referred to as game audio data. The next moment of the moment T1 is, for example, a moment T2. The game picture is, for example, game video frame data, and the audio is, for example, at least one of game background sound or background audio frame data.

The media transmission module 21*c* may be configured to receive a cloud gaming access request transmitted by User U1, perform authentication on User U1 based on the received cloud gaming access request, and in a case of successful authentication, allow User U1 to access the cloud server B through the livestreamer terminal A and establish a game service connection between the cloud server B and the cloud gaming client corresponding to User U1. In this embodiment of this application, the process corresponding to the media transmission module 21*c* may be collectively referred to as the media transmission process in the cloud server B, and the media transmission process may be run in another virtual container independent of the cloud virtual container. In this embodiment of this application, the another virtual container for data forwarding and mixing may be collectively referred to as an auxiliary virtual container.

When the media transmission process corresponding to the media transmission module 21*c* receives an audio/video stream (e.g., an audio/video stream 100*a*) transmitted by the media coding process corresponding to the media coding module 21*b*, audio/video coding may be performed on the audio/video stream 100*a* based on the terminal screen information of the livestreamer terminal A (the coded audio/video stream may be collectively referred to as a game coded stream), and the game coded stream may be transmitted to the livestreamer terminal A corresponding to User U1 through the network. The coded audio/video stream is, for example, an audio/video stream 100*b*. The audio/video stream 100*b* carries a video stream coded by the media coding module 21*b* according to a cloud gaming coding standard. When receiving the game coded stream returned by the cloud server B through the media transmission module 21*c*, the livestreamer terminal A may decode the game coded stream to obtain an audio/video sequence corresponding to the game coded stream, so that the cloud gaming picture of the target cloud gaming livestreamed by User U1 can be displayed on a cloud gaming display interface of the livestreamer terminal A.

In the process of playing the target cloud gaming, User U1 may detect the voice input operation of User U1 in real time through the livestreamer terminal A running the cloud gaming client, and transmit voice data of User U1 corresponding to the voice input operation to the media transmission module 21*c* through the game service connection. When the media transmission module 21*c* receives the voice data of User U1 (the voice data of User U1 may be collectively referred to as audio data of the livestreamer object), the audio data may be forwarded to the media coding module 21*b* shown in FIG. 2 through the media transmission process corresponding to the media transmission module 21*c*, so that the media coding module 21*b* injects the audio data into the cloud gaming instance.

In a cloud gaming livestreaming scene, the media coding module 21*b* may also start another video coding according to a cloud livestreaming coding standard, so as to perform coding according to the fixed frame rate, the frame group length, etc. indicated by the cloud livestreaming coding standard to obtain another video stream. The another video stream is different from the video stream coded according to the cloud gaming coding standard. For example, the frame group length here is used for describing an interval between two I-frames. For example, the frame group length may be 120 frames. The fixed frame rate here may be 60 fps, which means that an I-frame appears every 2 seconds.

As shown in FIG. 2, in the cloud gaming livestreaming scene, the media transmission module 21*c* may further mix, when receiving voice data of User U1 (i.e., the aforementioned audio data), the audio data with the audio captured by the media coding module 21*b* (i.e., the aforementioned game audio data) in real time to obtain mixed audio data. The livestreamer terminal A for collecting the aforementioned audio data and the cloud server B for collecting the game audio data may use different reference frames, so that there may be a certain time interval between the timestamp of the collected game audio data and the timestamp of the audio data in different reference frames, Therefore, in order to ensure the synchronization of the audio and video played by the viewer terminal subsequently, according to this embodiment of this application, in the cloud gaming livestreaming scene, the timestamp (i.e., audio collection timestamp) of the audio (i.e., the game audio data collected periodically by the media coding module 21*b* at a fixed audio collection time interval) captured by the media coding module 21*b* may be used as a reference timestamp, so that the mixing timestamp of the mixed audio data is consistent with the audio collection timestamp of the aforementioned game audio data.

The cloud server B may forward at least one of the mixed audio data, the mixing timestamp (i.e., the aforementioned audio collection timestamp), the game image data or the image collection timestamp to the media forwarding module 22*a* shown in FIG. 2 through the media transmission module 21*c*, As shown in FIG. 2, the media forwarding module 22*a* may be deployed in the cloud gaming central cluster for providing cloud stream pushing services. The cloud gaming central cluster may include one or a plurality of cloud gaming central servers. The plurality means at least two. Each cloud gaming central server may be integrated with the media forwarding module 22*a*, so that the audio/video transmitted by the media transmission module 21*c* may be cached to a priority queue through the media forwarding module 22*a*. In this way, the audio/video packet can be acquired from the priority queue corresponding to the media forwarding module 22*a* at the aforementioned fixed interval subsequently, and further, audio/video coding can be performed on the acquired audio/video packet to code the livestreaming data stream of the target cloud gaming.

The cloud server B may push the livestreaming data stream to the livestreaming server C through the media forwarding module 22*a*, so that the livestreaming server C delivers in real time the livestreaming data stream to a viewer terminal shown in FIG. 2, for example, at least one of a viewer terminal D1 or a viewer terminal D2, when receiving a livestream pulling request of a player in the same virtual livestreaming room as the livestreamer object. The livestreaming client run in each viewer terminal can synchronously play the mixed audio data and the game image data based on the audio collection timestamp and the image collection timestamp in the livestreaming data stream, so that the mixed audio and video can be played synchronously at the viewer terminal.

As shown in FIG. 2, the livestreaming server C may include a livestreaming edge server 201*a*, a livestreaming origin server 202*a* and a livestreaming forwarding server 203*a* shown in FIG. 2. The livestreaming edge server 201*a* may be configured to receive a pushed livestreaming data stream (supporting protocols such as rtmp, hls, webrtc, etc.), and may forward the livestreaming data stream to the livestreaming origin server 202*a*. The livestreaming origin server 202*a* may be a server in an origin cluster. The livestreaming origin server 202*a* may be configured to cache livestreaming data streams received in recent times, and may also be configured to perform at least one of the following post-processing on the livestreaming data stream, such as transcoding, recording or porn detection. Besides, the livestreaming origin server 202*a* may also receive a command for requesting stream pulling transmitted by the viewer terminal and forwarded by the livestreaming forwarding server 203*a*, The livestreaming origin server 202*a* is, for example, OriginServer. The livestreaming forwarding server 203*a* may be an edge node deployed all over the country, for example, a CDN node. The livestreaming forwarding server 203*a* may be configured to cache some popular media files and forward a media stream obtained after post-processing by the livestreaming origin server 202*a*, and may also deliver the media stream to a viewer object corresponding to each viewer terminal. The viewer object may be the player in the same virtual livestreaming room as the livestreamer object.

Besides, when a certain player requests to watch a live video of a certain cloud gaming but the live video of the cloud gaming is not cached in the livestreaming forwarding server 203*a*, the livestreaming forwarding server 203*a* may pull streams from the livestreaming origin server 202*a* and further cache the pulled live video locally, so as to deliver the live video to the viewer terminal corresponding to the player. For the specific process of acquiring, by the cloud server, game imago data and game audio data, and mixing the game audio data and the audio data, reference may be made to the embodiment corresponding to FIG. 3 to FIG. 8 below.

Figure 3:
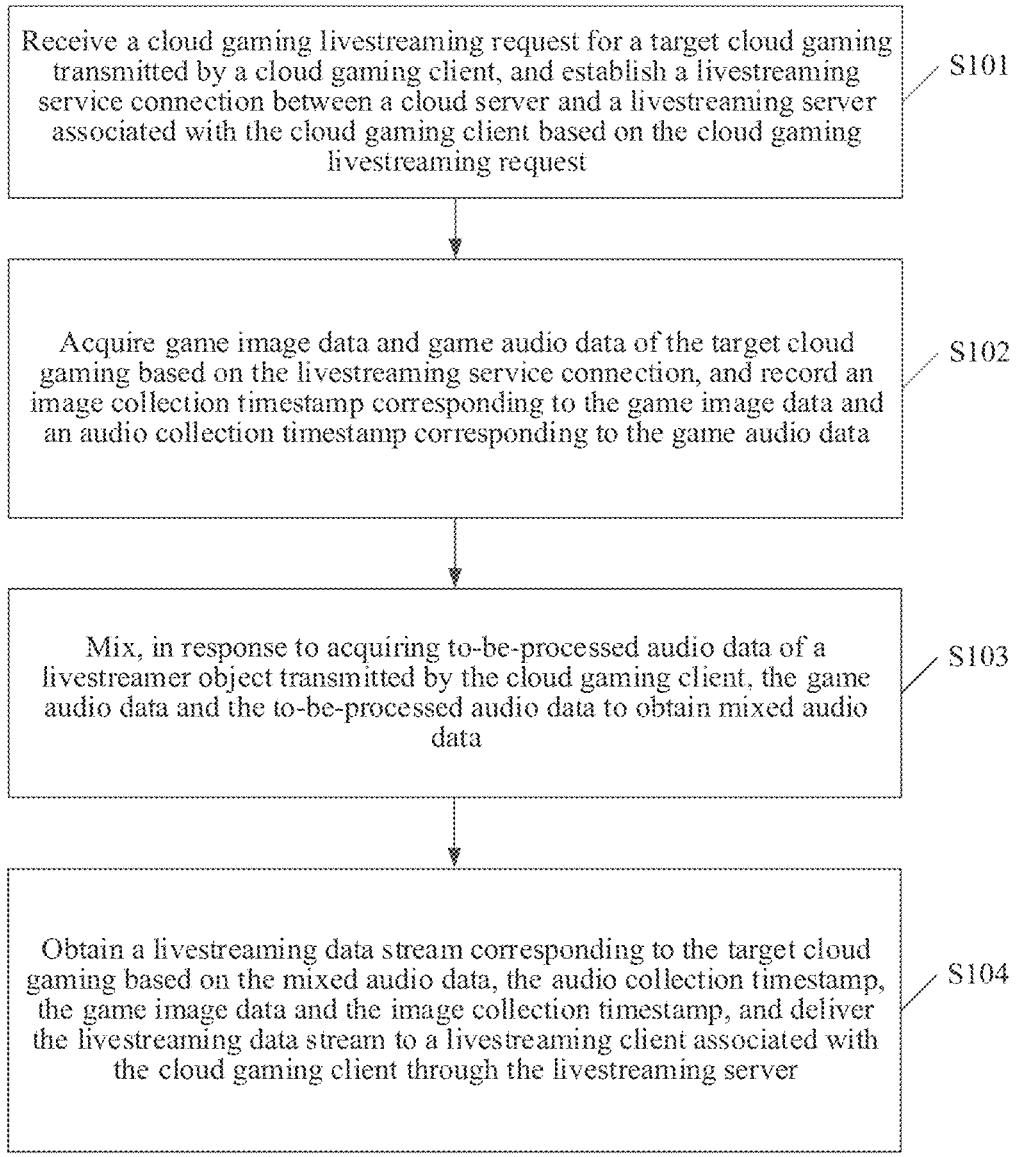
FIG. 3 is a schematic flowchart of a game data processing method according to an embodiment of this application.

In some embodiments, as shown in FIG. 3, a schematic flowchart of a game data processing method is provided. As shown in FIG. 3, the method may be executed by a computer device. The computer device may be a cloud server. The cloud server may be the cloud server B in the embodiment corresponding to FIG. 2. The computer device may also be a player game terminal. The player game terminal may be the livestreamer terminal A in the embodiment corresponding to FIG. 2. The method involved in this embodiment of this application may be executed by the player game terminal, or by the cloud server corresponding to the player game terminal, or jointly by the player game terminal and the cloud server. In an example where the method is executed by a cloud server, this embodiment describes the specific process of mixing game audio data and audio data in the cloud server. The method may at least include step S101 to step S104 as follows:

Step S101: Receive a cloud gaming livestreaming request for a target cloud gaming transmitted by a cloud gaming client, and establish a livestreaming service connection between a cloud server and a livestreaming server associated with the cloud gaming client based on the cloud gaming livestreaming request.

Specifically, the computer device (e.g., the cloud server) may receive the cloud gaming livestreaming request for the target cloud gaming transmitted by the cloud gaming client in a cloud gaming livestream pushing scene (i.e., in a cloud gaming scene where the target cloud gaming is livestreamed in the cloud).

The cloud gaming livestreaming request is generated by the cloud gaming client in response to a trigger operation executed by the livestreamer object for the livestreaming indication control. Further, the computer device (e.g., the cloud server) may transmit a livestreaming authentication request to the livestreaming server associated with the cloud gaming client based on a game start identifier carried in the cloud gaming livestreaming request such that the livestreaming server may configure a livestream pushing address for livestreaming the target cloud gaming for the cloud gaming client based on the livestreaming authentication request. Further, the computer device (e.g., the cloud server) may receive the livestream pushing address returned by the livestreaming server, and trigger, in response to returning the livestream pushing address to the cloud gaming client, the establishment of the livestreaming service connection between the cloud server and the livestreaming server.

Figure 4:
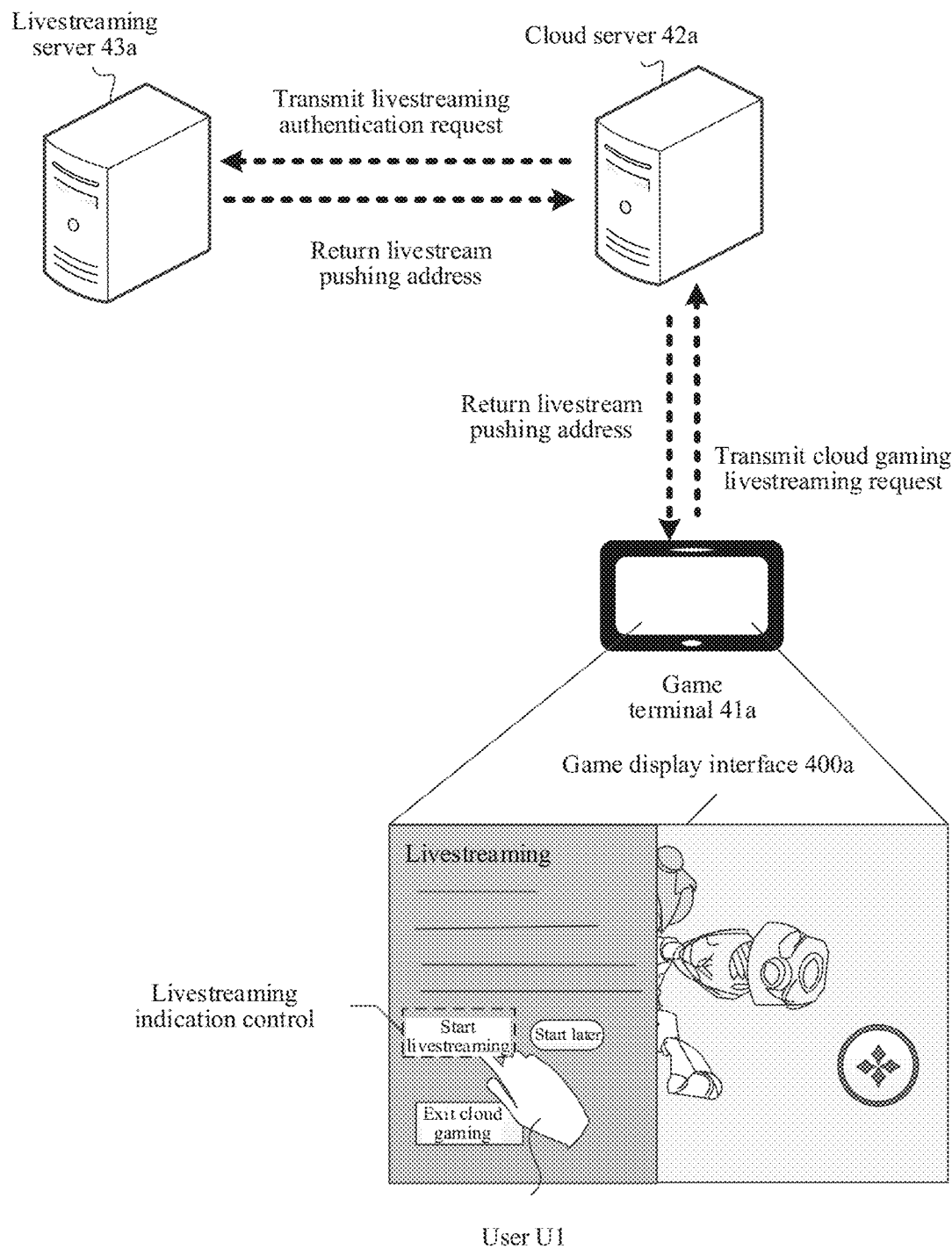
FIG. 4 is a schematic diagram showing a cloud livestreaming scene for a target cloud gaming in a cloud gaming scene according to an embodiment of this application.

FIG. 4 is a schematic diagram showing a cloud livestreaming scene for a target cloud gaming in a cloud gaming scene according to an embodiment of this application. A game display interface 400*a* as shown in FIG. 4 is the display interface of the target cloud gaming currently being played by User U1. The target cloud gaming is the cloud gaming of interest selected by User U1 on the cloud gaming client run in the game terminal 41*a* shown in FIG. 4. In the cloud gaming livestreaming scene, User U1 may be a livestreamer object that needs to livestream the target cloud gaming, and the livestreamer object may be understood as a game object that accesses the cloud gaming client through the game start identifier, i.e., User U1 shown in FIG. 4. The game start identifier may be, for example, a cloud gaming account.

In some embodiments, as shown in FIG. 4, the cloud server 42*a* may receive a cloud gaming livestreaming request (i.e., information flow to start livestreaming cloud gaming) transmitted by User U1, or a cloud gaming end request transmitted by User U1. As shown in FIG. 4, when User U1 needs to exit cloud gaming, an exit control for exiting cloud gaming may be triggered, and the game terminal 41*a* may generate, in response to the trigger operation for the exit control, a cloud gaming end request that can be transmitted to the cloud server 42*a* for ending the cloud gaming being livestreamed currently. When receiving the cloud gaming end request transmitted for the target cloud gaming (i.e., information flow to end livestreaming cloud gaming), the cloud server 42*a* may interrupt the livestreaming service connection for data interchange with the cloud livestreaming server 43*a*.

Step S102: Acquire game image data and game audio data of the target cloud gaming based on the livestreaming service connection, and record an image collection timestamp corresponding to the game image data and an audio collection timestamp corresponding to the game audio data.

When the cloud server captures a game picture and audio in real time through a data collection component indicated by a media coding process, in order to provide a stable frame rate in a cloud gaming livestream pushing scene, in this embodiment of this application, the game picture (i.e., game video frame data) and audio (i.e., game background sound) captured in real time may be cached into a cloud memory (i.e., buffer), so that corresponding data can be captured through a timer at a fixed collection interval from the cloud memory subsequently. In this embodiment of this application, the game pictures collected through the timer at a collection end (i.e., the game video frame data cached in the cloud memory) may be collectively referred to as game image data, and the timestamps for collecting the game image data recorded by the timer may be collectively referred to as image collection timestamps.

In this embodiment of this application, the game background sound collected by the timer at the collection end may be collectively referred to as game audio data, and timestamps for collecting the game audio data recorded through the timer may be collectively referred to as audio collection timestamps. In order to ensure the synchronization of the game background sound and the game picture played by the viewer terminal subsequently, it is necessary to ensure the image collection timestamp and the audio collection timestamp to be timestamps in the same reference frame, so as to avoid transmission delay caused by data transmitted in a plurality of cloud service modules in the cloud.

Figure 5:
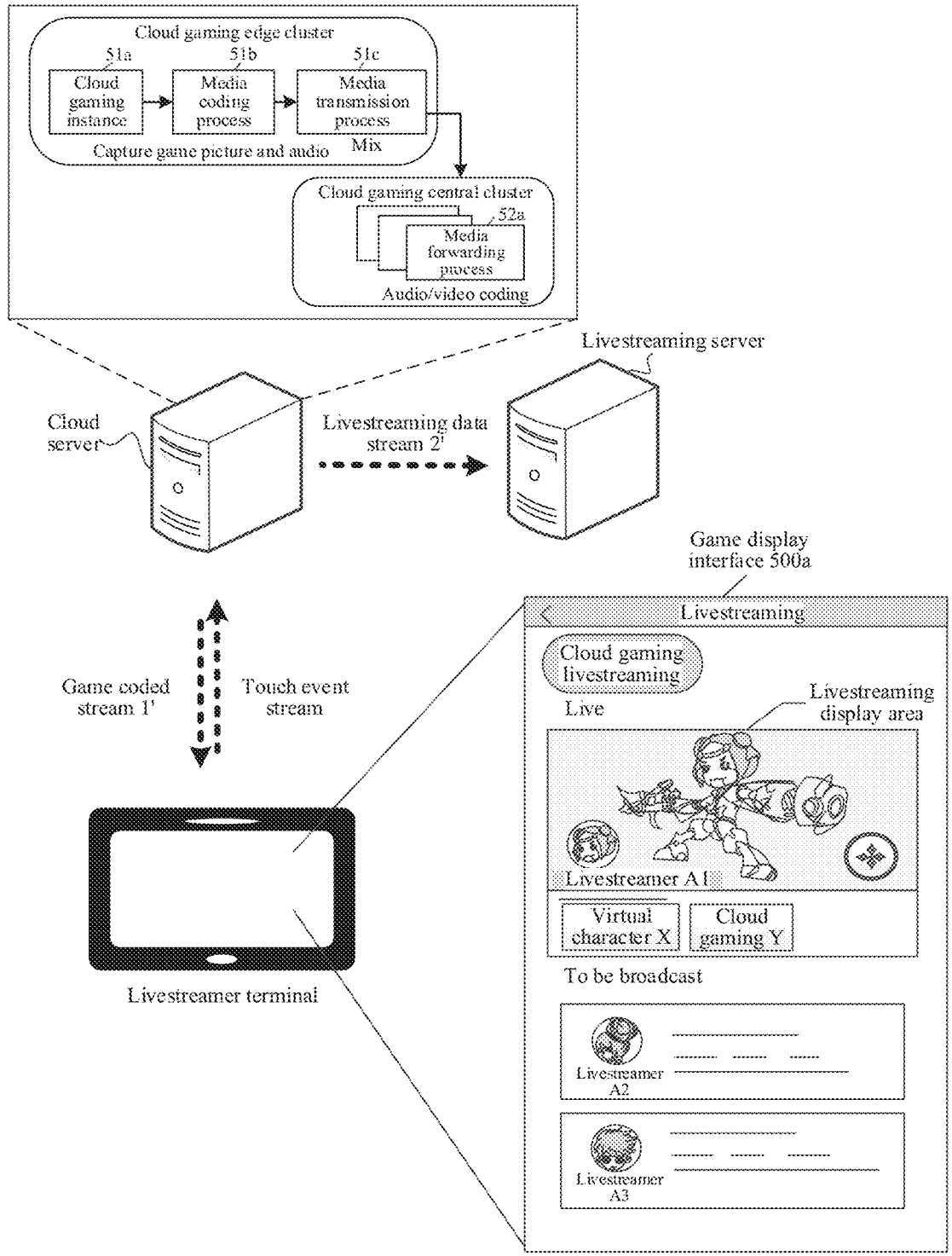
FIG. 5 is a schematic diagram showing a scene of capturing a game picture and an audio through a media coding process according to an embodiment of this application.

It is to be understood that since livestreaming needs a stable frame rate, in this embodiment of this application, the game picture and audio captured by the data collection component may be previously cached in the cloud memory, so that the audio and video data with the corresponding frame rate can be captured through the timer at a fixed time interval from the cloud memory subsequently, and then coded. Specifically, as shown in FIG. 5, the cloud server may collect image frames matched with a first frame rate (e.g., 30 fps) indicated by a first collection time interval (e.g., 33 ms) from the game video frame data stored in the cloud memory through the timer indicated by the media coding process 51b, take the collected image frames as the game image data of the target cloud gaming, and record the image collection timestamps corresponding to the game image data in a reference frame indicated by the timer. Further, cloud server may further collect an audio frame matched with a second frame rate (e.g., 100 fps) indicated by a second collection time interval (e.g., 10 ms) from the background audio frame data stored in the cloud memory through the timer, take the collected audio frame as the game audio data of the target cloud gaming, and record the audio collection timestamp corresponding to the game audio data in the same reference frame indicated by the timer. The first collection time interval, the first frame rate, the second collection time interval and the second frame rate may be preset or set as required. For example, the first collection time interval is 33 ms, the first frame rate is 30 fps, the second collection time interval is 10 ms, and the second frame rate is 100 fps.

It is to be understood that the coding performance required by the codec device for video frames is higher than the performance required by the codec device for audio frames, and users have a greater demand for audio perception. Therefore, in order to prevent the timer from collecting excessive video frames and avoid audio freezing, in this embodiment of this application, the second collection time interval may be set smaller than the first collection time interval in the process of audio and video collection. In this way, the second frame rate indicated by the second collection time interval will be greater than the first frame rate indicated by the first collection time interval. Based on this, according to this embodiment of this application, different frame rates are set in the process of audio and video collection. This can fundamentally avoid collecting excessive video frames in a unit collection time interval (i.e., in one first collection time interval), thereby reducing excessive consumption of video coding performance caused by excessive video frames.

Step S103: Mix, in response to acquiring audio data of a livestreamer object transmitted by the cloud gaming client, the game audio data and the audio data to obtain mixed audio data.

A mixing timestamp corresponding to the mixed audio data is consistent with the audio collection timestamp. The audio collection timestamp may also be referred to as a collected audio timestamp.

Specifically, the cloud server may decode, in response to acquiring the audio data of the livestreamer object transmitted by the cloud gaming client, the audio data to obtain a audio frame of the livestreamer object and a recording timestamp of the audio frame. The cloud server may acquire the audio frame in the game audio data based on the second collection time interval corresponding to the game audio data, take the acquired audio frame as a reference audio frame, and determine a mixing timestamp of the reference audio frame according to the collected audio timestamp corresponding to the game audio data. The cloud server may adjust the recording timestamp based on the mixing timestamp, mix the reference audio frame and the audio frame based on the adjusted recording timestamp to obtain a mixed audio frame corresponding to the mixing timestamp consistent with the collected audio timestamp, and take the obtained mixed audio frame and the mixing timestamp corresponding to the mixed audio frame as the mixed audio data of the target cloud gaming.

Step S104: Obtain a livestreaming data stream corresponding to the target cloud gaming based on the mixed audio data, the audio collection timestamp, the game image data and the image collection timestamp, and deliver the livestreaming data stream to a livestreaming client associated with the cloud gaining client through the livestreaming server.

The cloud server includes a media forwarding process started based on the cloud gaming livestreaming request. The media forwarding process is used for keeping the livestreaming service connection between the cloud server and the livestreaming server. The media forwarding process may be the media forwarding process 52a in the embodiment corresponding to FIG. 5.

In some embodiments, the cloud server may acquire the mixed audio data, acquire mixed audio frames and the audio collection timestamps corresponding to the mixed audio frames from the mixed audio data, sort the mixed audio frames based on the audio collection timestamps, and write the sorted mixed audio frames into an audio cache queue associated with the media forwarding process. The cloud server may acquire the game image data, acquire image frames and the image collection timestamps corresponding to the image frames from the game image data, sort the image frames based on the image collection timestamps, and write the sorted image frames into a video cache queue associated with the media forwarding process. The cloud server may acquire a smooth acquisition thread associated with the media forwarding process, acquire a video data packet matched with a first frame rate indicated by a first collection time interval from the video cache queue through the smooth acquisition thread, and acquire an audio data packet matched with a second frame rate indicated by a second collection time interval from the audio cache queue through the smooth acquisition thread. The cloud server may packetize the video data, packet and the audio data packet to obtain the livestreaming data stream corresponding to the target cloud gaming, and deliver the livestreaming data stream to the livestreaming client associated with the cloud gaming client through the livestreaming server.

In this embodiment of this application, the cloud server may establish the livestreaming service connection between the cloud server and the livestreaming server associated with the cloud gaming client based on the cloud gaming livestreaming request when receiving the cloud gaming livestreaming request for the target cloud gaming transmitted by the cloud gaming client. The cloud server may acquire the game image data and the game audio data of the target cloud gaming based on the livestreaming service connection, and record the image collection timestamp corresponding to the game image data and the audio collection timestamp corresponding to the game audio data. To improve the accuracy of audio-video synchronization during the data transmission delay process, in this embodiment of this application, in the cloud gaming livestreaming scene, the image collection timestamp and the audio collection timestamp are ensured to be the timestamps in the same reference frame, so that reliable audio-video synchronization can be realized based on these timestamps in the same reference frame. Further, the computer device mixes, in response to acquiring the audio data of the livestreamer object transmitted by the cloud gaming client, the game audio data and the audio data to obtain the mixed audio data. In the cloud gaming livestreaming scene, the sound of the livestreamer object is recorded by the cloud gaining client, and the game background sound is captured by the cloud server in the cloud. Considering that there is data transmission between the cloud gaming client and the cloud server and what the player perceives is the game picture synchronous with the game background sound, in the process of mixing the sound of the livestreamer object (i.e., the audio data) and the game background sound, the audio collection timestamp of the game background sound may be used as a reference, so that the mixing timestamp corresponding to the mixed audio data is consistent with the audio collection timestamp. Further, the computer device may obtain the livestreaming data stream corresponding to the target cloud gaming based on the mixed audio data, the audio collection timestamp, the game image data and the image collection timestamp, and further deliver the livestreaming data stream to the livestreaming client associated with the cloud gaming client through the livestreaming server, so that the livestreaming client synchronously plays the mixed audio data and the game image data based on the audio collection timestamp and the image collection timestamp in the livestreaming data stream. Thus, in the cloud gaming livestreaming scene, the cloud gaming client pushes the livestreaming data stream to the livestreaming server not directly but through the cloud server, so that the strong computing power of the cloud server can be utilized to reduce the performance consumption of the cloud gaming client side. In addition, the audio-video synchronization based on the audio collection timestamp and the image collection timestamp at the cloud server side can solve the problem of out-of-sync audio and video caused by jitter and disorder in the livestream pushing process, realize synchronization during multi-stream mixing and avoid freezing, thereby realizing reliable audio-video synchronization. In this way, when the mixed audio data and the game image data are played synchronously in the livestreaming client based on the audio collection timestamp and the image collection timestamp in the livestreaming data stream, the mixed audio and video can be played synchronously.

In some embodiments, before the receiving a cloud gaming livestreaming request for a target cloud gaming transmitted by a cloud gaming client, the method further includes: performing, in response to acquiring a game access request transmitted for the target cloud gaming by the cloud gaming client, authentication processing on a game start identifier corresponding to the cloud gaming client based on the game access request to obtain an authentication result corresponding to the game start identifier, the game access request carrying a client environment system where the cloud gaming client is located; establishing, when the authentication result indicates that the cloud gaming client has permission to access the target cloud gaming through the game start identifier, a game service connection between the cloud server and the cloud gaming client, and configuring, based on the game service connection, a cloud virtual container for running the target cloud gaming for the client environment system where the cloud gaming client is located; and starting a game process of the target cloud gaining in the cloud virtual container, and running the target cloud gaming through the game process.

The player game terminal may be used as the front end of the cloud gaming client, and the cloud server may be used as the background of the cloud gaming client. After acquiring the game access request transmitted by the game object in the player game terminal, the cloud server may extract the game start identifier corresponding to the cloud gaming client carried in the game access request and perform authentication processing on the game start identifier to obtain the authentication result corresponding to the game start identifier. The cloud server may establish, when the authentication is successful, i.e., the cloud gaming client corresponding to the game user has permission to access the target cloud gaming through the game start identifier, the game service connection between the cloud server and the cloud gaming client, and configure, based on the game service connection, the cloud virtual container for running the target cloud gaming for the client environment system where the cloud gaming client is located.

The game access request may also carry the client environment system where the cloud gaming client is located. The client environment system may include, but not limited to, Android system. For example, the client environment system may also include HarmonyOS system or iOS system run in the player game terminal.

The cloud server may be configured to run a plurality of cloud virtual containers, and each cloud virtual container is a container instance. Each container instance may run a remote mobile game running environment matched with the client environment system in the corresponding player game terminal. The remote mobile game running environment virtualized for each player user terminal in the cloud server may be collectively referred to as a cloud gaming environment system. For example, the cloud gaming environment system may be a remote Android system virtualized for each user terminal in the cloud server. Any cloud virtual container can be used for providing a basic virtualized Android running environment for the corresponding player game terminal. For example, after configuring the cloud virtual container for running the target cloud gaming for the livestreamer terminal A, the cloud server may start the game process of the target cloud gaming in the cloud virtual container and run the target cloud gaining through the game process.

When the game user triggers a game icon of the target cloud gaining in the player game terminal, the game process associated with the game icon can be started in the cloud virtual container, and further, a corresponding frame may be allocated for the game process in the cloud virtual container, so that internal rendering is implemented by using the in-container rendering technology to obtain the game display interface to be displayed in the player game terminal. The game display interface may include a service control with a function of controlling a game character to execute corresponding services.

The game display interface corresponding to the cloud gaming client may further include a livestreaming indication control for indicating performing cloud gaming livestreaming by the livestreamer object. The livestreamer object may be a game object that accesses the target cloud gaming through the game start identifier.

In this embodiment, when the authentication result indicates that the cloud gaming client has permission to access the target cloud gaming through the game start identifier, the game service connection between the cloud server and the cloud gaming client is established, thereby improving the security of the established game service connection.

In some embodiments, the game display interface corresponding to the cloud gaming client includes a livestreaming indication control for indicating performing cloud gaming livestreaming by the livestreamer object. The operation of establishing a livestreaming service connection between a cloud server and a livestreaming server associated with the cloud gaming client based on the cloud gaming livestreaming request includes: receiving the cloud gaming livestreaming request for the target cloud gaming transmitted by the cloud gaming client. The cloud gaming livestreaming request is generated by the cloud gaming client in response to a trigger operation executed by the livestreamer object for the livestreaming indication control.

Specifically, as shown in FIG. 4, the game terminal 41a may output, according to a livestreaming demand of User U1, a subpage including the livestreaming indication control for indicating performing cloud gaming livestreaming by the livestreamer object on the game display interface 400a. For example, the subpage here may be a floating window independent of the game display interface 400a. As shown in FIG. 4, User U1 may execute a trigger operation for the "livestreaming indication control" for starting livestreaming on the floating window. At this time the game terminal 41a may generate, in response to the trigger operation executed by User U1 for the livestreaming indication control, the cloud gaming livestreaming request shown in FIG. 4. The cloud gaming livestreaming request carries a cloud gaming account of User U1 for accessing the cloud gaming client. The cloud gaming account may be the account registered in the cloud server 42a after User U1 passes the real-name authentication.

In this embodiment, the game display interface includes the livestreaming indication control, which can indicate the cloud gaming livestreaming of the livestreamer object, thereby improving the interchange efficiency and further improving the resource utilization rate.

In some embodiments, the cloud gaming livestreaming request carries the game start identifier. The establishing a livestreaming service connection between a cloud server and a livestreaming server associated with the cloud gaming client based on the cloud gaming livestreaming request includes: transmitting a livestreaming authentication request to the livestreaming server associated with the cloud gaming client based on the game start identifier such that the livestreaming server configures a livestream pushing address for livestreaming the target cloud gaming for the cloud gaming client based on the livestreaming authentication request; and receiving the livestream pushing address returned by the livestreaming server, and triggering, in response to returning the livestream pushing address to the cloud gaming client, the establishment of the livestreaming service connection between the cloud server and the livestreaming server.

Specifically, as shown in FIG. 4, the cloud server 42a may further generate, in response to receiving the cloud gaming livestreaming request transmitted by the game terminal 41a running the cloud gaming client, the livestreaming authentication request shown in FIG. 4 based on the cloud gaming account carried in the cloud gaming livestreaming request, and transmit the livestreaming authentication request to the livestreaming server 43a shown in FIG. 4, so that the livestreaming server 43a can search whether there is a livestreaming account bound to the cloud gaming account in the livestreaming system based on the livestreaming authentication request. If so, the livestream pushing address shown in FIG. 4 can be configured for the cloud gaming client run in the game terminal 41a based on the acquired livestreaming authentication request.

It is to be understood that both the cloud server 42a and the livestreaming server 43a can be configured to store a binding relationship between the livestreaming account and the cloud gaming account. It is to be understood that the livestreaming account here is the account for livestreaming registered by User U1 in the livestreaming server 43a associated with the livestreaming client through a certain livestreaming client.

As shown in FIG. 4, the cloud server 42a may receive the livestream pushing address returned by the livestreaming server 43a and return the livestream pushing address to the cloud gaining client run in the game terminal 41a, so that the currently running target cloud gaming can be livestreamed in the cloud gaming client. It is to be understood that in this embodiment of this application, the cloud server 42a may further trigger, in response to returning the livestream pushing address to the cloud gaming client, the establishment of the livestreaming service connection between the cloud server 42a and the livestreaming server 43a, so that while User U1 is livestreaming the target cloud gaming subsequently, the cloud server 42a can perform data interchange with the cloud livestreaming server 43a based on the livestreaming service connection.

In this embodiment, the cloud server triggers, in response to returning the livestream pushing address to the cloud gaming client, the establishment of the livestreaming service connection between the cloud server and the livestreaming server, so that the cloud server performs data interchange with the cloud livestreaming server based on the livestreaming service connection, thereby improving the data interchange efficiency.

In some embodiments, the target cloud gaming is run by the game process in the cloud virtual container. The cloud virtual container is configured by the cloud server for the client environment system where the cloud gaming client is located. The acquiring game image data and game audio data of the target cloud gaming based on the livestreaming service connection, and recording an image collection timestamp corresponding to the game image data and an audio collection timestamp corresponding to the game audio data includes: starting, based on the livestreaming service connection, a media coding process associated with the game process in the cloud virtual container; capturing game background audio frame data and game video frame data associated with the target cloud gaming through a data collection component indicated by the media coding process, and storing the captured background audio frame data and the game video frame data in a cloud cache space associated with the data collection component, the cloud cache space being a cloud memory independent of the cloud virtual container; collecting an image frame matched with a first frame rate indicated by a first collection time interval from the game video frame data stored in the cloud memory through a timer indicated by the media coding process, taking the collected image frame as the game image data of the target cloud gaming, and recording the image collection timestamp corresponding to the game image data in a reference frame indicated by the timer, and collecting an audio frame matched with a second frame rate indicated by a second collection time interval from the background audio frame data stored in the cloud memory through the tinier, taking the collected audio frame as the game audio data of the target cloud gaming, and recording the audio collection timestamp corresponding to the game audio data in the same reference frame indicated by the timer, the second collection time interval being smaller than the first collection time interval, and the second frame rate being greater than the first frame rate.

The target cloud gaming run by the game process may be the cloud gaming instance of the cloud gaming run in the cloud gaming instance module 21*a* in the embodiment corresponding to FIG. 2. The media coding process may be an associated process associated with the target cloud gaming provided by the media coding module 21*b* in FIG. 2.

As shown in FIG. 5, a schematic diagram showing a scene of capturing a game picture and an audio through a media coding process is provided. The cloud server shown in FIG. 5 may be the cloud server 42*a* in the embodiment corresponding to FIG. 4, and the livestreamer terminal shown in FIG. 5 may be the game terminal 41*a* in the embodiment corresponding to FIG. 4.

The game process corresponding to the cloud gaming instance 51*a* shown in FIG. 5 may be nm in the cloud virtual container configured by the cloud server for the client environment system where the cloud gaining client is located. As shown in FIG. 5, When the livestreaming service connection between the cloud server and the livestreaming server is established, the cloud server may start the media coding process 51*b* associated with the game process in the cloud virtual container running the cloud gaining instance 51*a* based on the livestreaming service connection. It is to be understood that the media coding process 51*b* here may be the associated process associated with the target cloud gaming provided by the media coding, module 21*b* in the embodiment corresponding to FIG. 2.

In an example Where the client environment system is Android system, as shown in FIG. 5, the media coding process 51*b* here may be used for capturing the game picture and audio of the cloud gaming instance 51*a* in real time through a data collection component (e.g., Android VirtualDisplay, i.e., a component provided by Android system). The game picture here refers to the game video frame data captured in the target cloud gaming. The audio here refers to the background audio frame data of the target cloud gaming, i.e., the background audio frame data is the game background sound captured in real time in the cloud gaming. The data collection component may be used for capturing the picture of a virtual screen or virtual window provided by the cloud. The virtual screen or virtual window here can be understood as a copy of a physical screen of an Android window in the livestreamer terminal shown in FIG. 5, The game picture and the audio captured through the data collection component may be stored in the cloud memory (i.e., the cloud cache space) associated with the cloud virtual container, i.e., there is no need to render them in the cloud memory.

In this embodiment of this application, the media coding process 51*b* may perform two coding operations. One coding operation is to perform audio/video coding on the captured game picture and audio according to a cloud gaining coding standard to obtain a game coded stream 1' shown in FIG. 5. The other coding operation is to perform audio/video coding on the periodically collected game pictures and audio with a corresponding frame rate according to a cloud livestreaming coding standard to obtain a livestreaming data stream 2' shown in FIG. 5. The reason why the two coding operations are needed here is that when transmission interruption occurs to the media transmission module, the game service connection at the livestreamer terminal side may be temporarily interrupted within an allowable interruption duration, but the livestreaming service connection is not interrupted, that is, the live video pushed by the livestreamer terminal can still be seen at the viewer terminal within the allowable interruption duration. This can fundamentally prevent livestreaming from being interrupted by the temporary interruption of the game service connection within the allowable interruption duration caused by network anomaly of the player.

As shown in FIG. 5, the cloud server may also take the obtained game coded stream 1' as response information of User U1 for a touch event stream executed by the livestreamer terminal. The cloud server may also push the obtained livestreaming data stream 2' to the livestreaming server shown in FIG. 5.

In this embodiment, the game picture and audio (i.e., the game background sound) captured in real time are cached in the cloud memory, and corresponding data are captured through the tinier at a fixed collection interval from the cloud memory, so that a stable frame rate can be provided in the cloud gaming livestream pushing scene, thereby improving the smoothness of livestreaming.

In some embodiments, the method further includes: running a first coding thread associated with the media coding process in the cloud virtual container; acquiring a cloud gaming coding standard indicated by the first coding thread, and performing audio coding on the captured background audio frame data based on the cloud gaming coding standard to obtain a first audio coded stream of the target cloud gaming; performing video coding on the captured game video frame data based on the cloud gaming coding standard to obtain a first video coded stream of the target cloud gaming; and taking the first audio coded stream and the first video coded stream as a game coded stream of the target cloud gaining, and returning the game coded stream to the cloud gaming client such that the cloud gaming client decodes the game coded stream to obtain the background audio frame data and the game video frame data to be synchronously played in the cloud gaining client.

For example, in FIG. 5, there is no need to provide an audio/video data packet with a fixed frame rate and a fixed frame group length for the player while the player is playing the target cloud gaming. Therefore, the cloud server may run, when receiving the touch event stream executed by the livestreamer object for the cloud gaming client, the first coding thread associated with the media coding process 51*b* in the cloud virtual container in response to the touch event stream, and perform audio coding on the background audio frame data captured in real time according to the cloud gaming coding standard indicated by the first coding thread so as to obtain the first audio coded stream of the target cloud gaining. In the meanwhile, the cloud server may also perform video coding on the captured game video frame data according to the cloud gaming coding standard to obtain the first video coded stream of the target cloud gaming. As a result, the game coded stream 1' in FIG. 5 may include the first audio coded stream of the target cloud gaming and the first video coded stream of the target cloud gaming. As shown in FIG. 5, the livestreamer terminal may decode, when receiving the game coded stream 1', the game coded stream 1' quickly to obtain the background audio frame data and the game video frame data to be synchronously played in the cloud gaming client. The game picture corresponding to the game video frame data may be the picture in the livestreaming display area shown in the game display interface 500*a* shown in FIG. 5.

In this embodiment, audio coding is performed on the captured background audio frame data according to the cloud gaming coding standard to obtain the first audio coded stream of the target cloud gaming, and video coding is performed on the captured game video frame data according to the cloud gaming coding standard to obtain the first video coded stream of the target cloud gaming, thereby improving the coding efficiency.

In some embodiments, the cloud server is configured to run the game process, the media coding process and a media transmission process. The media transmission process is run in an auxiliary virtual container independent of the cloud virtual container. The method further includes: running a second coding thread associated with the media coding process in the cloud virtual container acquiring a cloud livestreaming coding standard indicated by the second coding thread, and performing audio coding on the game audio data associated with the second frame rate based on the cloud livestreaming coding standard to obtain a second audio coded stream of the target cloud gaming; performing video coding on the game image data associated with the first frame rate based on the cloud livestreaming coding standard to obtain a second video coded stream of the target cloud gaming; and taking the second audio coded stream and the second video coded stream as a to-be-processed coded stream of the target cloud gaming, and forwarding the to-be-processed coded stream to the media transmission process such that the media transmission process executes the operation of mixing, in response to acquiring audio data of a livestreamer object transmitted by the cloud gaming client, the game audio data and the audio data to obtain mixed audio data in the auxiliary cloud virtual container based on the to-be-processed coded stream.

The cloud server shown in FIG. 5 may be configured to run the game process corresponding to the cloud gaming instance 51*a*, the media coding process 51*b* and the media transmission process 51*c* shown in FIG. 5. It is to be understood that the media transmission process here may be run in the auxiliary virtual container independent of the cloud virtual container.

It is to be understood that in the cloud gaming livestreaming scene (i.e., the cloud gaming livestream pushing scene), the cloud server may further run the second coding thread associated with the media coding process 51*b* in the cloud virtual container. At this time, the cloud server may acquire the cloud livestreaming coding standard indicated by the second coding thread and perform audio coding on the game audio data associated with the second frame rate according to the cloud livestreaming coding standard to obtain the second audio coded stream of the target cloud gaining. In the meanwhile, the cloud server may further perform video coding on the game image data associated with the first frame rate according to the cloud livestreaming coding standard to obtain the second video coded stream of the target cloud gaming. This means that the livestreaming data stream 2' shown in FIG. 5 may at least include the second audio coded stream and the second video coded stream.

For example, the cloud server may take the second audio coded stream and the video coded stream as the to-be-processed coded stream of the target cloud gaming, and further forward the to-be-processed coded stream to the media transmission process 51*c* shown in FIG. 5, so that the media transmission process 51*c* can execute step S103 in the auxiliary cloud virtual container based on the to-be-processed coded stream, i.e., the game audio data and the received audio data are mixed through the media transmission process 51*c*. Further, the mixed audio data and the game image data may be forwarded to the media forwarding process 52*a* shown in FIG. 5, so that audio/video coding can be performed on the mixed audio data and the game image data through the media forwarding process 52*a* to obtain the livestreaming data stream 2' to be pushed to the livestreaming server.

It is to be understood that the media forwarding process here may be another associated process associated with the target cloud gaming provided by the media forwarding module 22*a* in the embodiment corresponding to FIG. 2. It is to be understood that as shown in FIG. 2, the media forwarding module 22*a* may request, after receiving a start-streaming request (i.e., the above-mentioned cloud gaming livestreaming request), the media coding module 21*b* shown in FIG. 2 to start new video coding (i.e., according to coding requirements of the live video (i.e., the above-mentioned cloud livestreaming coding standard), for example, the live video is required to have a fixed frame group length and a fixed frame rate), and then the media forwarding module 22*a* may start real-time mixing (for example, mix the sound of the game and the sound of the livestreamer), so that the game video stream (newly started by the media coding module 21*b*) and the (mixed) audio stream can be forwarded to the media forwarding module 22*a*. The start-streaming request refers to the cloud gaming livestreaming request. The coding requirements of the live video refer to the cloud livestreaming coding standard, for example, the live video is required to have a fixed frame group length and a fixed frame rate.

In this embodiment, audio coding is performed on the game audio data associated with the second frame rate according to the cloud livestreaming coding standard to obtain the second audio coded stream of the target cloud gaming, and video coding is performed on the game image data associated with the first frame rate according to the cloud livestreaming coding standard to obtain the second video coded stream of the target cloud gaming, thereby improving the coding efficiency.

In some embodiments, the mixing, in response to acquiring audio data of a livestreamer object transmitted by the cloud gaming client, the game audio data and the audio data to obtain mixed audio data includes: decoding, in response to acquiring the audio data of the livestreamer object transmitted by the cloud gaming client, the audio data to obtain a audio frame of the livestreamer object and a recording timestamp of the audio frame; acquiring the audio frame in the game audio data based on the second collection time interval corresponding to the game audio data, taking the acquired audio frame as a reference audio frame, and determining a mixing timestamp of the reference audio frame according to a collected audio timestamp corresponding to the game audio data; and adjusting the recording timestamp based on the mixing timestamp, mixing the reference audio frame and the audio frame based on the adjusted recording timestamp to obtain a mixed audio frame corresponding to the mixing timestamp consistent with the collection timestamp, and taking the obtained mixed audio frame and the mixing timestamp corresponding to the mixed audio frame as the mixed audio data of the target cloud gaming.

In this embodiment of this application, the user can perceive whether the audio and video played al the viewer terminal are synchronized or not, and the machine cannot perceive whether they are synchronized. Therefore, in the process of cloud stream pushing at the cloud server side, the collection timestamps of each audio frame and video frame collected can be recorded, and the corresponding collection timestamps can also be pushed to the livestreaming server during livestream pushing. Based on this, at the play terminal, such as the viewer terminal D1 and the viewer terminal D2, when the latest audio and video frames are pulled, they can be sorted and synchronized quickly according to the collection timestamps of the audio frame and the video frame, for example, video-to-audio synchronization may be performed such that the audio and video are played synchronously in the livestreaming client. In this embodiment of this application, it is important to previously, record the collection timestamps of the collected audio and video frames during the cloud stream pushing at the cloud server side, which is the key to audio-video synchronization. This is because in the transmission process of multimedia data (i.e., audio and video frames), each audio and video frame may have a delay in each transfer module, and it is inevitably inaccurate to calculate the collection timestamps in the media forwarding module. Therefore, this embodiment of this application proposes that it is necessary to previously record the collection timestamp of each audio and video at the collection end (for example, the media coding module).

For the play terminal running the livestreaming client, the player shall meet the following requirements for the timestamps of the received audio and video frames:
  1) The collection timestamps of the audio need to increase monotonically. 2) The collection timestamps of the video need to increase monotonically. 3) The difference between the collection timestamp of the audio and the collection timestamp of the video cannot be too large, for example, it needs to be less than 1000 ms.

Similarly, for the collection end at the cloud server side, the timestamps of the collection end shall meet the following requirements:
  1) The arrival interval between the audio and video frames is basically accurate.

For example, according to the above-mentioned collection time interval, an audio packet may be collected every 10 ms, and a video packet may be collected every 33 ms, so that the frame rates of the audio and video frames are relatively stable.
  2) The collection timestamps of the audio and video frames at the collection end need to use the same reference frame.

For example, it is not allowed to use the time of the media coding module for the audio and the time of the media transmission module for the video. For the convenience of understanding, both the audio and the video use the time of the media coding module to record the image collection timestamp of each collected video frame and the audio collection timestamp of each audio frame.
  3) The intervals of the audio and video are basically accurate when the audio and video are outputted alternately.

The intervals of the audio and video shall be stable in the process of coding, outputting and stream pushing to the livestreaming server, otherwise, there will be freezing.

In this embodiment of this application, the cloud server may mix the sound of the target cloud gaming (i.e., the game audio data) and the sound of the livestreamer (i.e., the audio data) through the media transmission process. However, considering that the timestamp of the terminal for collecting the sound of the livestreamer (i.e., the game audio data) is different from the timestamp of the game audio data, in this embodiment of this application, the cloud server needs to use the audio collection timestamp corresponding to the game audio data. This is because the viewer is mainly concerned with the synchronization of the game pictures and the game background sound.

In this embodiment, the recording timestamp is adjusted based on the mixing timestamp, the reference audio frame and the audio frame are mixed based on the adjusted recording timestamp to obtain the mixed audio frame corresponding to the mixing timestamp consistent with the collection timestamp, and the obtained mixed audio frame and the mixing timestamp corresponding to the mixed audio frame are taken as the mixed audio data of the target cloud gaming, so that the game picture is synchronous with the game background sound.

In some embodiments, during the mixing process, the cloud server may count the number of the acquired audio frames, and characterize, when the number of the audio frames is M and M is a non-zero positive integer, the number of times of mixing to be performed with M. The cloud server may enhance, in executing the operation of adjusting the recording timestamp based on the mixing timestamp, mixing the reference audio frame and the audio frame based on the adjusted recording timestamp, the volume of the audio frame based on the number of times of mixing to be performed, and reduce the volume of the reference audio frame. When the number of the audio frames is null or the number of the audio frames is null, the cloud server may also skip mixing the reference audio frame and the audio frame. During the mixing process, the following points can be taken into consideration:
  1) If it is required to highlight the sound of the livestreamer, then the game background sound may be turned down before the mixing, so that the mixing can be performed after the sound of the livestreamer is turned up.
  2) A mixing component WebRTC, AudioMixer may be used for mixing. The mixing component (i.e., WebRTC AudioMixer) has the following characteristic when being used for mixing: when fetching data from each audio stream, if all the audio sources are null, then the mixed audio frames are mute data, instead of returning a mixing failure. When the mute data are pushed to a remote stream, freezing may occur. Therefore, before the mixing, it is required to determine whether all the audio frames to be mixed are null. If so, the mixing is skipped. The audio sources refer to the audio frames corresponding to the game background sound and the audio frames corresponding to the live sound.
  3) The audio has a fixed sampling rate, so the number of times of mixing cannot be too large, nor too small. If the number of times of mixing is too large, the sound will be chaotic. If the number of times of mixing is too small, there will be freezing. Therefore, it is suggested to trigger the mixing at a fixed collection interval corresponding to the game background sound, such as every 10 ms, so as to avoid the case where data of a certain audio stream do not come because of network jitter at a time point. For example, this can avoid the case where only one stream is mixed at a time point T1 while only the other stream is mixed at another time point, for example, T2.

Based on this, according to this embodiment of this application, one audio stream may be used as the main stream during the mixing. The input frequency of the main stream needs to be stable, for example, 100 packets per second, so that the mixing can be performed according to the frame rate of the main stream. The packets of the game background sound are outputted stably, so the game background sound can be used as the main stream, and the mixing is triggered at the fixed collection interval corresponding to the game background sound, for example, every 10 ms. In this way, before the mixing, the number of frames of the main stream acquired may be counted. If the number of frames is 0 (i.e., null), then the mixing operation is skipped. Conversely, if the number of frames is M (i.e., a non-zero positive integer), the mixing operation can be performed M times.

In this embodiment, the number of the acquired audio frames is counted to obtain the number of times of mixing to be performed, so that the number of times of mixing to be performed is determined accurately.

In some embodiments, the method further includes: skipping, when the number of the audio frames is null or the number of the audio frames is null, mixing the reference audio frame and the audio frame.

Specifically, before the mixing, the number of frames of the main stream acquired may be counted. If the number of frames is 0 (i.e., null), then the mixing operation is skipped.

In this embodiment, when the number of the audio frames is null or the number of the audio frames is null, the mixing the reference audio frame and the audio frame is skipped, thereby making the mixing more reasonable.

In some embodiments, the cloud server may acquire the mixed audio data, acquire mixed audio frames and the audio collection timestamps corresponding to the mixed audio frames from the mixed audio data, sort the mixed audio frames based on the audio collection timestamps, and write the sorted mixed audio frames into an audio cache queue associated with the media forwarding process. The cloud server may acquire the game image data, acquire image frames and the image collection timestamps corresponding to the image frames from the game image data, sort the image frames based on the image collection timestamps, and write the sorted image frames into a video cache queue associated with the media forwarding process. The cloud server may acquire a smooth acquisition thread associated with the media forwarding process, acquire a video data packet matched with a first frame rate indicated by a first collection time interval from the video cache queue through the smooth acquisition thread, and acquire an audio data packet matched with a second frame rate indicated by a second collection time interval from the audio cache queue through the smooth acquisition thread. The cloud server may packetize the video data packet and the audio data packet to obtain the livestreaming data stream corresponding to the target cloud gaming, and deliver the livestreaming data stream to the livestreaming client associated with the cloud gaming client through the livestreaming server.

In this embodiment, in the media forwarding module at the cloud server side, a priority queue+smooth acquisition thread is adopted to improve the smoothness of the audio and video played at the viewer terminal.

In some embodiments, the acquiring a smooth acquisition thread associated with the media forwarding process, acquiring a video data packet matched with a first frame rate indicated by a first collection time interval from the video cache queue through the smooth acquisition thread, and acquiring an audio data packet matched with a second frame rate indicated by a second collection time interval from the audio cache queue through the smooth acquisition thread includes: the cloud server may acquire the smooth acquisition thread associated with the media forwarding process, acquire a data collection component having a same collection time interval as the smooth acquisition thread, and determine the first collection time interval associated with the game image data and the second collection time interval associated with the game audio data based on the collection time interval of the data collection component. The cloud server may determine a smooth video acquisition timestamp matched with the first collection time interval through the smooth acquisition thread, acquire a cached video frame with an image collection timestamp smaller than the smooth video acquisition timestamp from the video cache queue, and encapsulate the acquired cached video frame and the image collection timestamp corresponding to the cached video frame to obtain the video data packet matched the first frame rate indicated by the first collection time interval. The cloud server may determine a smooth audio acquisition timestamp matched with the second collection time interval through the smooth acquisition thread, acquire a cached audio frame with an audio collection timestamp smaller than the smooth audio acquisition timestamp from the audio cache queue, and encapsulate the acquired cached audio frame and the audio collection timestamp corresponding to the cached audio frame to obtain the audio data packet matched the second frame rate indicated by the second collection time interval.

Figure 6:
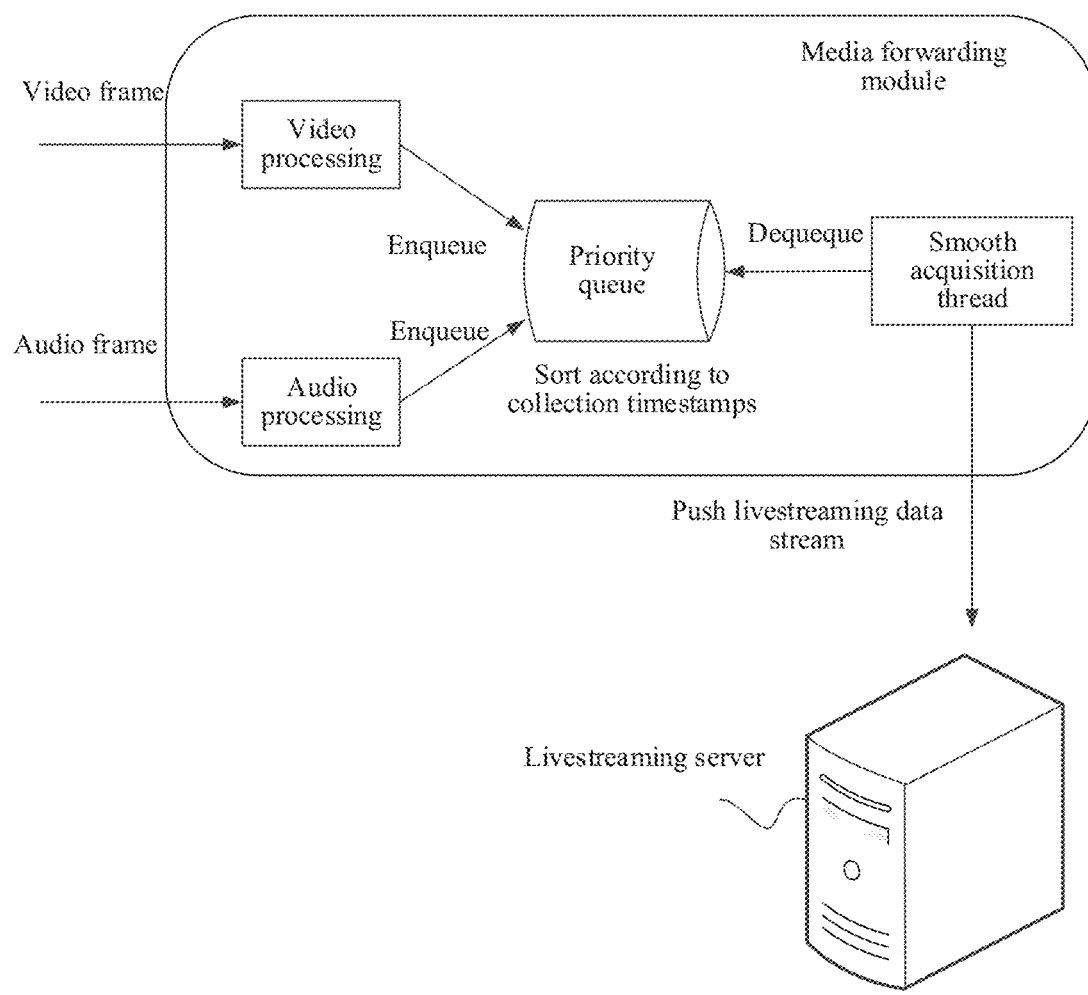
FIG. 6 is a schematic diagram showing a scene of a media forwarding module according to an embodiment of this application.

FIG. 6 is a schematic diagram showing a scene of a media forwarding module according to an embodiment of this application. The media forwarding module in FIG. 6 may be the cloud service module corresponding to the media forwarding process in the embodiment corresponding to FIG. 5.

The multimedia data, when being transmitted inside the cloud server, flow through multiple modules having different processing speeds, for example, each module may process multimedia data such as audio data and video data at different speeds, which may lead to packet loss, disordered arrivals and transmission congestion during the transmission of multimedia data. Based on this, if the media forwarding module shown in FIG. 6, after receiving the livestreaming data stream transmitted from other modules, directly push the received livestreaming data stream to the livestreaming server, this may cause freezing at the viewer terminal where the livestreaming client is located.

In this embodiment, in order to improve the smoothness of the audio and video played at the viewer terminal, a priority queue+smooth acquisition thread (i.e., buffer+pacing) is adopted in the media forwarding module at the cloud server side. That is, when the media forwarding module in the cloud server receives the audio frame and the video frame, the received audio frame and video frame do not need to be sent out immediately. For example, the received audio frame and video frame may be stored in the priority queue in FIG. 6 according to the received frame rate.

Specifically, as shown in FIG. 6, the media forwarding module may temporarily process the received audio frame and store the processed audio frame in the priority queue shown in FIG. 6, and may also temporarily process the received video frame and store the processed video frame in the priority queue shown in FIG. 6. The priority queue may include an audio cache queue for storing audio frames and a video cache queue for storing video frames. In this example of this application, the audio frames and the video frames written into the priority queue need to be sorted according to the collection timestamps, so that the data frame with a smaller collection timestamp can be preferentially taken from the priority queue through the smooth acquisition thread subsequently, thereby minimizing the jitter or disorder during the internal transmission or processing process.

As shown in FIG. 6, the other pacing thread in the media forwarding module, i.e., the smooth acquisition thread, can try to acquire the audio/video packet from the priority queue within a fixed interval, and smoothly push the audio/video packet with the corresponding collection timestamp acquired within the fixed interval (i.e., the livestreaming data stream shown in FIG. 6) to the livestreaming server. For example, for the video data packets, a video data packet matched with a first frame rate indicated by a first collection time interval from the video cache queue may be acquired through the smooth acquisition thread, and an audio data packet matched with a second frame rate indicated by a second collection time interval may be acquired from the audio cache queue through the smooth acquisition thread. In this way, this buffer pacing strategy can avoid jitter in the frame rates of the received audio frames and video frames to some extent, thereby fundamentally ensuring the stability and smoothness of the audio data packets and the video data packets to be forwarded.

In general cases, within the cache duration, the timestamp of the audio/video packet currently pushed into the priority queue will be larger than the timestamp of the audio/video packet previously pushed into the priority queue with a high probability. However, it cannot be ruled out that occasionally the transmission jitter may cause disorder, for example, the timestamp of the audio/video packet currently pushed into the priority queue is smaller than the timestamp of the audio/video packet previously pushed into the priority queue.

Figure 7:
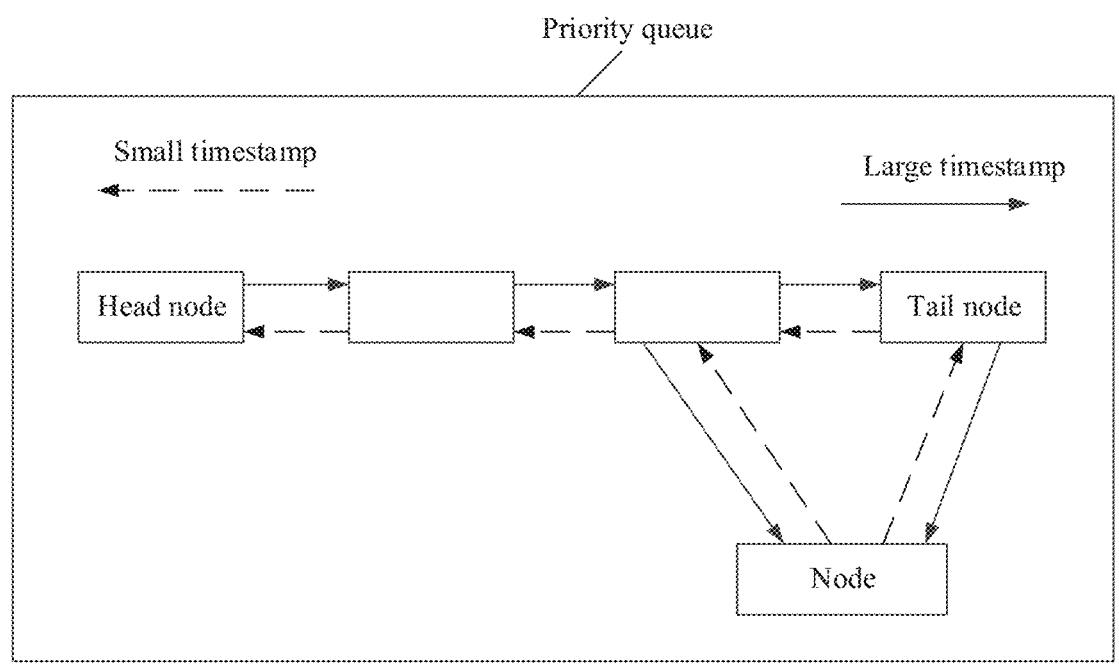
FIG. 7 is a schematic diagram showing a scene of a priority queue according to an embodiment of this application.

FIG. 7 is a schematic diagram showing a scene of a priority queue according to an embodiment of this application. The priority queue shown in FIG. 7 uses a doubly linked list to ensure the timestamp of the audio/video packet pushed into the queue each time to be larger than the timestamp of the audio/video packet previously pushed into the priority queue with a high probability. For example, the head node of the priority queue shown in FIG. 7 may be used for storing the audio/video data packet with a smaller collection timestamp, and the tail node of the priority queue shown in FIG. 7 may be used for storing the audio/video data packet with a larger collection timestamp. The head node, the tail node and other intermediate nodes are all stored in the cloud memory of the cloud server.

At the time of dequeuing, the media forwarding module may move the pointer of the head node to the next audio/video packet through the pacing thread based on a path indicated by the bidirectional link, for example, a path with the timestamps from smallest to largest.

In this embodiment, in the media forwarding module at the cloud server side, a priority queue+smooth acquisition thread is adopted to improve the smoothness of the audio and video played at the viewer terminal.

In some embodiments, after the delivering the livestreaming data stream to a livestreaming client associated with the cloud gaming client through the livestreaming server, the method further includes: determining a maximum audio collection timestamp of the livestreaming data stream; and discarding, when an audio collection timestamp of a to-be-transmitted audio data packet recorded through the smooth acquisition thread is smaller than the maximum audio collection timestamp, the to-be-transmitted audio data packet. The to-be-transmitted audio data packet refers to a next audio data packet to be transmitted to the livestreaming server.

The cloud server may acquire the audio data packet with the maximum audio collection timestamp from the livestreaming data stream as an auxiliary audio data packet.

In this embodiment, when the audio collection timestamp of the to-be-transmitted audio data packet recorded through the smooth acquisition thread is smaller than the maximum audio collection timestamp, the to-be-transmitted audio data packet is discarded, which can reduce the disorder caused by network jitter and improve the smoothness of the audio and video played synchronously.

In some embodiments, after the delivering the livestreaming data stream to a livestreaming client associated with the cloud gaming client through the livestreaming server, the method further includes: determining a maximum image collection timestamp of the livestreaming data stream; and discarding, when a video collection timestamp of a to-be-transmitted video data packet recorded through the smooth acquisition thread is smaller than the maximum video collection timestamp, the to-be-transmitted video data packet. The to-be-transmitted video data packet refers to a next video data packet to be transmitted to the livestreaming server.

The cloud server may acquire the video data packet with the maximum image collection timestamp from the livestreaming data stream as an auxiliary video data packet.

In this embodiment, when the image collection timestamp of the to-be-transmitted video data packet recorded through the smooth acquisition thread is smaller than the maximum image collection timestamp, the to-be-transmitted video data packet is discarded, which can reduce the disorder caused by network jitter and improve the smoothness of the audio and video played synchronously.

Figure 8:
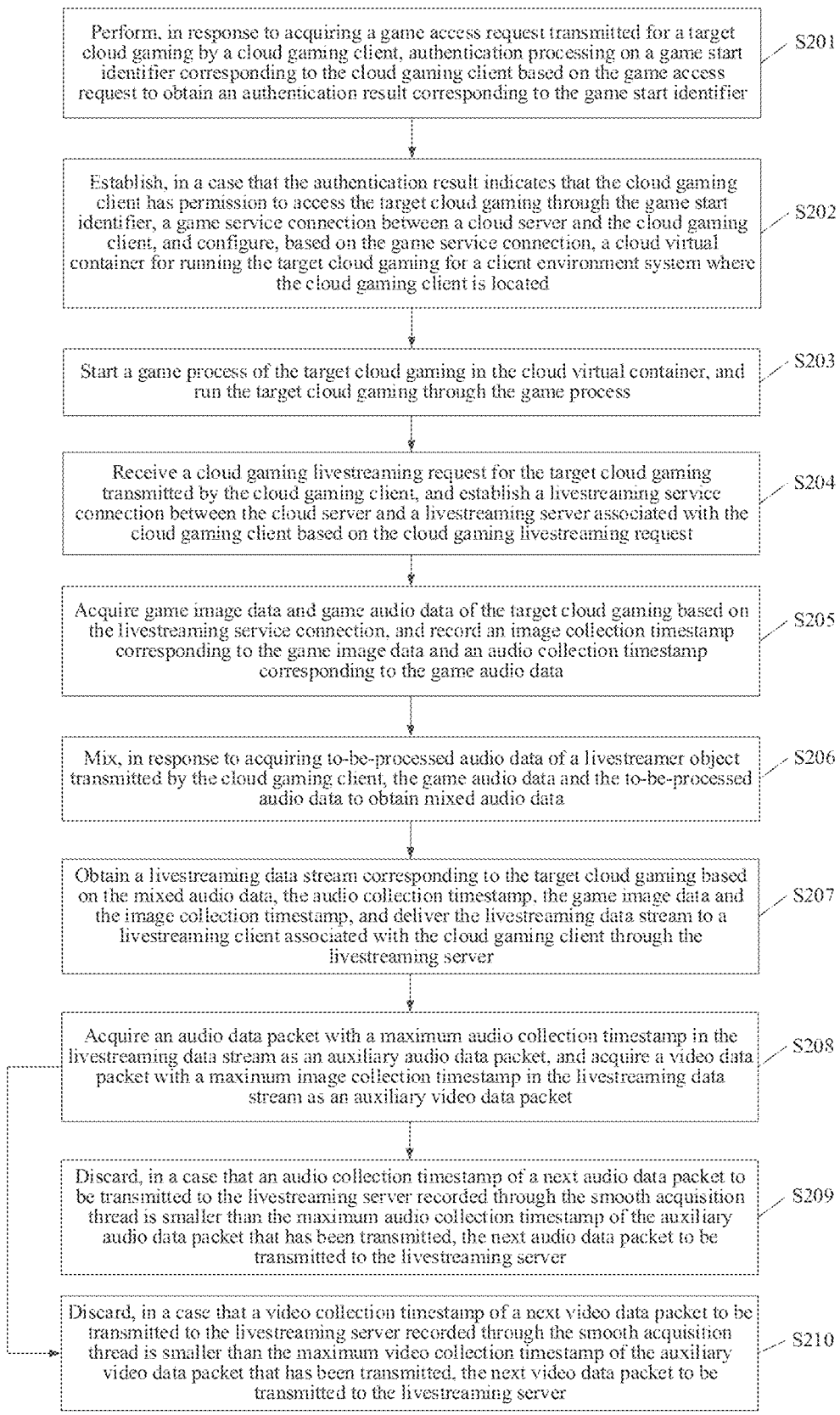
FIG. 8 is a schematic flowchart of a game data processing method according to an embodiment of this application.

FIG. 8 is a schematic flowchart of a game data processing method according to an embodiment of this application. As shown in FIG. 8, the computer device may be the cloud server in the embodiment corresponding to FIG. 3. The method may at least include step S201 to step S210 as follows:

Step S201: Perform, in response to acquiring a game access request transmitted for the target cloud gaming by the cloud gaming client, authentication processing on a game start identifier corresponding to the cloud gaming client based on the game access request to obtain an authentication result corresponding to the game start identifier.

Step S202: Establish, when the authentication result indicates that the cloud gaming client has permission to access the target cloud gaming through the game start identifier, a game service connection between the cloud server and the cloud gaming client, and configure, based on the game service connection, a cloud virtual container for running the target cloud gaming for the client environment system where the cloud gaming client is located.

Step S203: Start a game process of the target cloud gaming in the cloud virtual container, and run the target cloud gaming through the game process.

Step S204: Receive a cloud gaming livestreaming request for a target cloud gaming transmitted by a cloud gaming client, and establish a livestreaming service connection between a cloud server and a livestreaming server associated with the cloud gaming client based on the cloud gaming livestreaming request.

Specifically, the cloud server may receive the cloud gaming livestreaming request for the target cloud gaming transmitted by the cloud gaming client. The cloud gaming livestreaming request is generated by the cloud gaining client in response to a trigger operation executed by the livestreamer object for the livestreaming indication control. The cloud server may transmit a livestreaming authentication request to the livestreaming server associated with the cloud gaming client based on the game start identifier carried in the cloud gaming livestreaming request such that the livestreaming server configures a livestream pushing address for livestreaming the target cloud gaming for the cloud gaming client based on the livestreaming authentication request. The cloud server may receive the livestream pushing address returned by the livestreaming server, and trigger, in response to returning the livestream pushing address to the cloud gaming client, the establishment of the livestreaming service connection between the cloud server and the livestreaming server.

Step S205: Acquire game image data and game audio data of the target cloud gaming based on the livestreaming service connection, and record an image collection timestamp corresponding to the game image data and an audio collection timestamp corresponding to the game audio data.

The image collection timestamp and the audio collection timestamp are timestamps in a same reference frame.

Step S206: Mix, in response to acquiring audio data of a livestreamer object transmitted by the cloud gaming client, the game audio data and the audio data to obtain mixed audio data.

A mixing timestamp corresponding to the mixed audio data is consistent with the audio collection timestamp.

Step S207: Obtain a livestreaming data stream corresponding to the target cloud gaming based on the mixed audio data, the audio collection timestamp, the game image data and the image collection timestamp, and deliver the livestreaming data stream to a livestreaming client associated with the cloud gaming client through the livestreaming server such that the livestreaming client synchronously plays the mixed audio data and the game image data based on the audio collection timestamp and the image collection timestamp in the livestreaming data stream.

Step S208: Acquire an audio data packet with a maximum audio collection timestamp in the livestreaming data stream as an auxiliary audio data packet, and acquire a video data packet with a maximum image collection timestamp in the livestreaming data stream as an auxiliary video data packet.

Step S209: Discard, when an audio collection timestamp of a next audio data packet to be transmitted to the livestreaming server recorded through the smooth acquisition thread is smaller than the maximum audio collection timestamp of the auxiliary audio data packet that has been transmitted, the next audio data packet to be transmitted to the livestreaming server.

S210: Discard, when an image collection timestamp of a next video data packet to be transmitted to the livestreaming server recorded through the smooth acquisition thread is smaller than the maximum image collection timestamp of the auxiliary video data packet that has been transmitted, the next video data packet to be transmitted to the livestreaming server.

In this embodiment of this application, the cloud server may further execute step S208 to step S210 after executing step S207, which can reduce the disorder caused by network jitter and improve the smoothness of the audio and video played synchronously.

The multimedia data, when being transmitted inside the cloud server, flow through multiple cloud service modules having different processing speeds, for example, each cloud service module may process multimedia data such as audio data and video data at different speeds, which may lead to packet loss, disordered arrivals and transmission congestion during the transmission of multimedia data. Based on this, if the media forwarding module in the cloud server, after receiving the livestreaming data stream transmitted from other cloud service modules, directly push the received livestreaming data stream to the livestreaming server, this may inevitably cause freezing at the viewer terminal where the livestreaming client is located.

Figure 9:
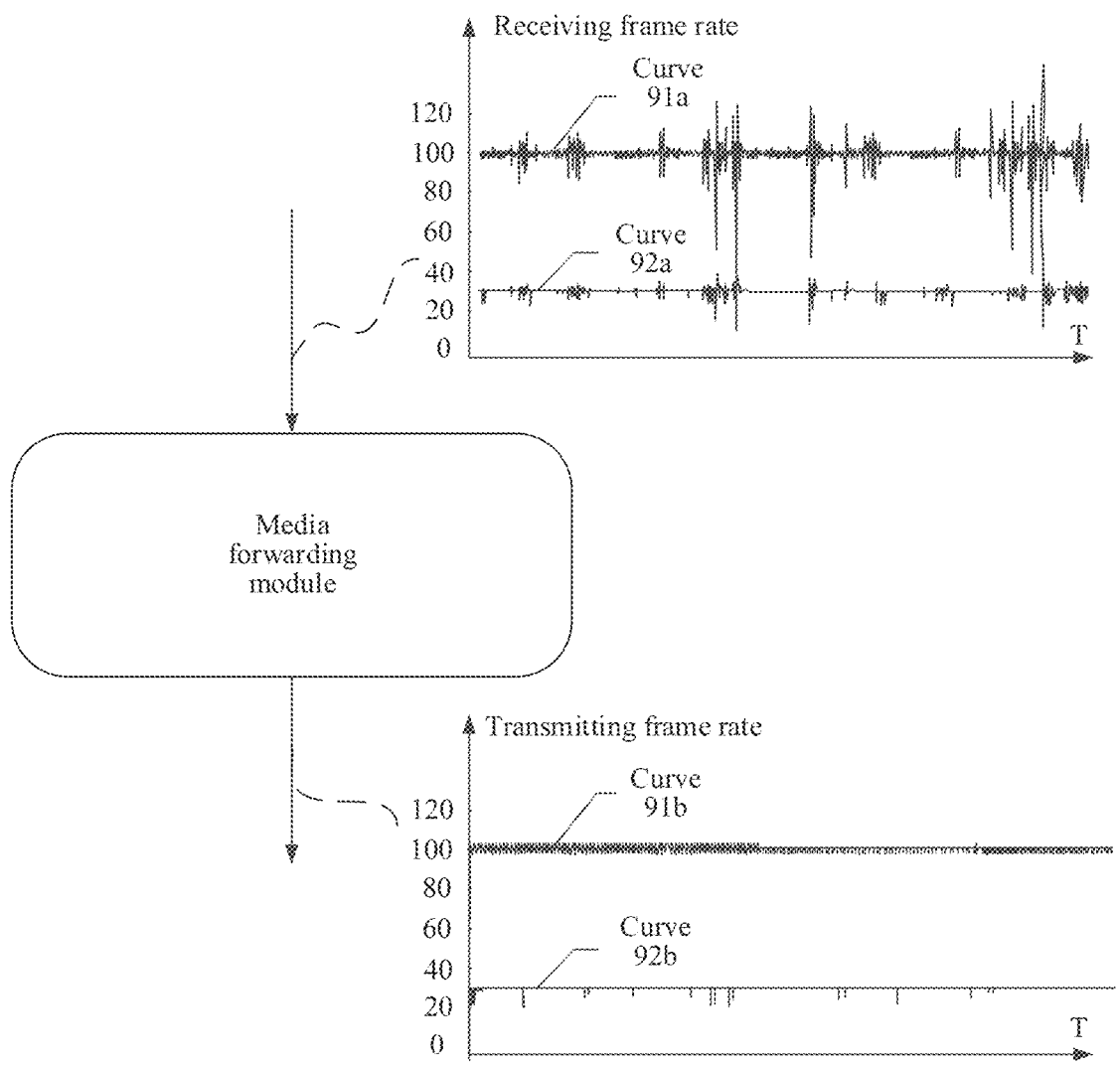
FIG. 9 is a schematic diagram showing a scene of smoothing an audio frame and a video frame received through a media forwarding module according to an embodiment of this application.

FIG. 9 is a schematic diagram showing a scene of smoothing an audio frame and a video frame received through a media forwarding module. As shown in FIG. 9, the media forwarding module may be configured to receive a mixed audio data stream and a video data stream coded by the second coding thread that are forwarded by the other cloud service module (i.e., the media transmission module). Specifically, Curve $91a$ may be used for characterizing a receiving frame rate of audio frames in the mixed audio data stream received by the media forwarding module. For example, the receiving frame rate of audio frames may be the second frame rate indicated by the second collection time interval, for example, 100 fps. Similarly, Curve $92a$ may be used for characterizing a receiving frame rate of video frames in the video data stream coded by the coding thread received by the media forwarding module. For example, the receiving frame rate of video frames may be the first frame rate indicated by the first collection time interval, for example, 30 fps.

As shown in FIG. 9, in order to improve the smoothness of the audio and video played at the viewer terminal, a priority queue+smooth acquisition thread is used at the cloud server side in this embodiment of this application. That is, when the media forwarding module in the cloud server receives the audio frame and the video frame, the received audio frame and video frame do not need to be sent out immediately, but are temporarily stored in a priority queue. The priority queue may include an audio cache queue for storing audio frames and a video cache queue for storing video frames. The other pacing thread can try to acquire the audio/video packet from the priority queue within a fixed interval, and smoothly transmit the audio/video packet with the corresponding collection timestamp acquired within the fixed interval to the livestreaming server.

Specifically, Curve $91b$ may be used for characterizing a transmitting frame rate of audio packets that the media forwarding module tries to acquire from the priority queue according to a same collection time interval as the collection end. For example, the transmitting frame rate of audio frames to be transmitted may be the second frame rate indicated by the second collection time interval. Curve $92b$ may be used for characterizing a transmitting frame rate of video packets that the media forwarding module tries to acquire from the priority queue according to a same collection time interval the as the collection end. At this time, the transmitting frame rate of video frames to be transmitted may be the first frame rate indicated by the first collection time interval. As can be seen, for the media forwarding module shown in FIG. 9, after the received audio/video stream is smoothed through the priority queue+smooth acquisition thread strategy, the curves of the dithered audio/video frames received may be smoothed, which can improve the stability and smoothness of the audio and video played at the viewer terminal.

In general cases, within the cache duration, the timestamp of the audio/video packet currently pushed into the priority queue will be larger than the timestamp of the audio/video packet previously pushed into the priority queue with a high probability. However, it cannot be ruled out that occasionally the transmission jitter may cause disorder, for example, the timestamp of the audio/video packet currently pushed into the priority queue is smaller than the timestamp of the audio/video packet previously pushed into the priority queue.

Based on this, considering that the priority queue may be used for caching frame data in the recent period, for example, frame data within a cache duration of 1 to 2 seconds, if disorder and jitter occur to the modules in the cloud server because of the network transmission problem and the duration of disorder and jitter exceeds the cache duration of the priority queue, then the timestamp of the last audio/video packet recorded through the pacing thread may be used to quickly determine whether the audio/video packet collected next time needs to be discarded.

For example, the cloud server disclosed in this embodiment of this application records, after acquiring one or a plurality of audio/video packets from the priority queue through the pacing thread and transmitting each acquired audio/video packet to the livestreaming server, the timestamp of the last audio packet and the timestamp of the video packet in these transmitted audio/video packets. In this way, if the timestamp of the next audio/video packet currently acquired from the priority queue through the pacing thread is smaller than the timestamp of the previous audio/video packet (i.e., the timestamp of the last audio packet and the timestamp of the video packet recoded), then the timestamp of the next audio/video packet currently acquired can be discarded.

In this embodiment of this application, in the cloud gaining livestreaming scene, the cloud gaming client pushes the livestreaming data stream to the livestreaming-server not directly but through the cloud server, so that the strong computing power of the cloud server can be utilized to fundamentally reduce the performance consumption of the cloud gaming client side. In addition, the audio-video synchronization based on the audio collection timestamp and the image collection timestamp at the cloud server side can solve the problem of out-of-sync audio and video caused by jitter and disorder in the livestream pushing process, realize synchronization during multi-stream mixing and avoid freezing, thereby realizing reliable audio-video synchronization. In this way, when the mixed audio data and the game image data are played synchronously in the livestreaming client based on the audio collection timestamp and the image collection timestamp in the livestreaming data stream, the mixed audio and video can be played synchronously.

Figure 10:
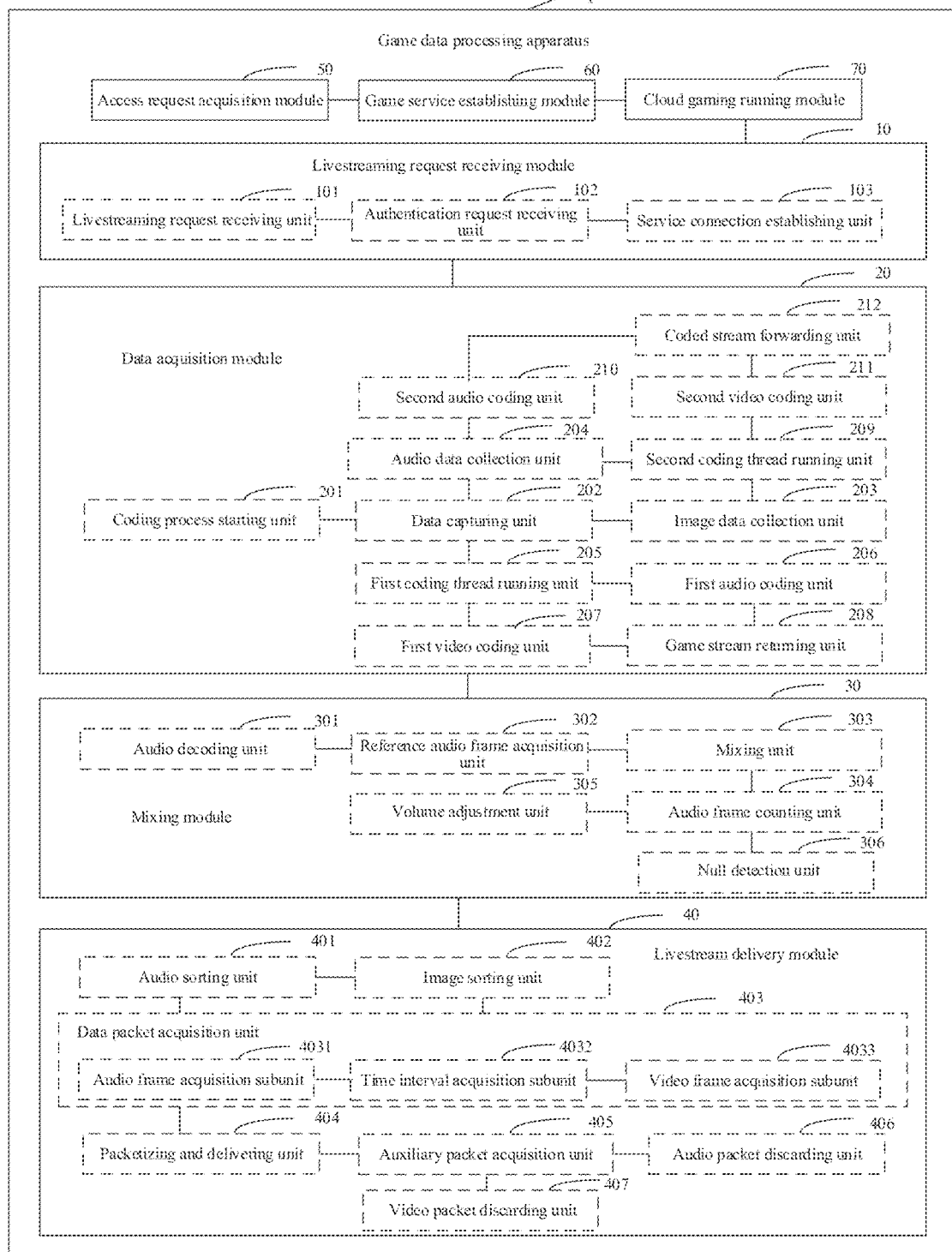
FIG. 10 is a schematic structural diagram of a game data processing apparatus according to an embodiment of this application.

Further, referring to FIG. 10, FIG. 10 is a schematic structural diagram of a game data processing apparatus according to an embodiment of this application. The game data processing apparatus 1 may be applied to a computer device. The computer device may be the cloud server B in the embodiment corresponding to FIG. 2. Further, the game data processing apparatus 1 may include: a livestreaming request receiving module 10, a data acquisition module 20, a mixing module 30 and a livestream delivery module 40. In some embodiments, before the livestreaming request receiving module 10 receives a cloud gaming livestreaming request for a target cloud gaming transmitted by a cloud gaming client, the game data processing apparatus 1 further includes: an access request acquisition module 50, a game service establishing module 60 and a cloud gaming running module 70.

The livestreaming request receiving module 10 is configured to receive a cloud gaming livestreaming request for a target cloud gaming transmitted by a cloud gaming client, and establish a livestreaming service connection between a cloud server and a livestreaming server associated with the cloud gaming client based on the cloud gaining livestreaming request.

The data acquisition module 20 is configured to acquire game image data and game audio data of the target cloud gaming based on the livestreaming service connection, and record an image collection timestamp corresponding to the game image data and an audio collection timestamp corresponding to the game audio data. The image collection timestamp and the audio collection timestamp are timestamps in a same reference frame.

The mixing module 30 is configured to mix, in response to acquiring audio data of a livestreamer object transmitted by the cloud gaming client, the game audio data and the audio data to obtain mixed audio data. A mixing timestamp corresponding to the mixed audio data is consistent with the audio collection timestamp.

The livestream delivery module 40 is configured to obtain a livestreaming data stream corresponding to the target cloud gaming based on the mixed audio data, the audio collection timestamp, the game image data and the image collection timestamp, and deliver the livestreaming data stream to a livestreaming client associated with the cloud gaming client through the livestreaming server.

In some embodiments, the apparatus further includes:

The access request acquisition module 50 is configured to perform, in response to acquiring a game access request transmitted for the target cloud gaming by the cloud gaming client, authentication processing on a game start identifier corresponding to the cloud gaining client based on the game access request to obtain an authentication result corresponding to the game start identifier. The game access request carries a client environment system where the cloud gaming client is located.

The game service establishing module 60 is configured to establish, when the authentication result indicates that the cloud gaining client has permission to access the target cloud gaming through the game start identifier, a game service connection between the cloud server and the cloud gaming client, and configure, based on the game service connection, a cloud virtual container for running the target cloud gaming for the client environment system where the cloud gaming client is located.

The cloud gaming running module 70 is configured to start a game process of the target cloud gaming in the cloud virtual container, and run the target cloud gaming through the game process.

In some embodiments, the game display interface corresponding to the cloud gaming client includes a livestreaming indication control for indicating performing cloud gaming livestreaming by the livestreamer object. The livestreaming request receiving module 10 includes: a livestreaming request receiving unit 101, an authentication request receiving unit 102 and a service connection establishing unit 103.

The livestreaming request receiving unit 101 is configured to receive the cloud gaming livestreaming request for the target cloud gaming transmitted by the cloud gaming client. The cloud gaming livestreaming request is generated by the cloud gaming client in response to a trigger operation executed by the livestreamer object for the livestreaming indication control.

In some embodiments, the livestreaming request receiving module 10 includes: an authentication request receiving unit 102 and a service connection establishing unit 103. The cloud gaming livestreaming request carries the game start identifier.

The authentication request receiving unit 102 is configured to transmit a livestreaming authentication request to the livestreaming server associated with the cloud gaming client based on the game start identifier such that the livestreaming server configures a livestream pushing address for livestreaming the target cloud gaining for the cloud gaming client based on the livestreaming authentication request.

The service connection establishing unit 103 is configured to receive the livestream pushing address returned by the livestreaming server, and trigger, in response to returning the livestream pushing address to the cloud gaming client, the establishment of the livestreaming service connection between the cloud server and the livestreaming server.

In some embodiments, the target cloud gaming is run by the game process in the cloud virtual container. The cloud virtual container is configured by the cloud server for the client environment system where the cloud gaming client is located. The data acquisition module 20 includes: a coding process starting unit 201, a data capturing unit 202, an image data collection unit 203 and an audio data collection unit 204.

The coding process starting unit 201 is configured to start, based on the livestreaming service connection, a media coding process associated with the game process in the cloud virtual container.

The data capturing unit 202 is configured to capture game background audio frame data and game video frame data associated with the target cloud gaming through a data collection component indicated by the media coding process, and store the captured background audio frame data and the game video frame data in a cloud cache space associated with the data collection component. The cloud cache space is a cloud memory independent of the cloud virtual container.

The image data collection unit 203 is configured to collect an image frame matched with a first frame rate indicated by a first collection time interval from the game video frame data stored in the cloud memory through a timer indicated by the media coding process, take the collected image frame as the game image data of the target cloud gaming, and record the image collection timestamp corresponding to the game image data in a reference frame indicated by the timer.

The audio data collection unit 204 is configured to collect an audio frame matched with a second frame rate indicated by a second collection time interval from the background audio frame data stored in the cloud memory through the timer, take the collected audio frame as the game audio data of the target cloud gaming, and record the audio collection timestamp corresponding to the game audio data in the same reference frame indicated by the timer. The second collection time interval is smaller than the first collection time interval, and the second frame rate is greater than the first frame rate.

In some embodiments, the data acquisition module 20 further includes: a first coding thread running unit 205, a first audio coding unit 206, a first video coding unit 207, a game stream returning unit 208, a second coding thread running unit 209, a second audio coding unit 210, a second video coding unit 211 and a coded stream forwarding unit 212.

The first coding thread running unit 205 is configured to run a first coding thread associated with the media coding process in the cloud virtual container.

The first audio coding unit 206 is configured to acquire a cloud gaming coding standard indicated by the first coding thread, and perform audio coding on the captured background audio frame data based on the cloud gaming coding standard to obtain a first audio coded stream of the target cloud gaming.

The first video coding unit 207 is configured to perform video coding on the captured game video frame data based on the cloud gaming coding standard to obtain a first video coded stream of the target cloud gaming.

The game stream returning unit 208 is configured to take the first audio coded stream and the first video coded stream as a game coded stream of the target cloud gaming, and return the game coded stream to the cloud gaming client such that the cloud gaming client decodes the game coded stream to obtain the background audio frame data and the game video frame data to be synchronously played in the cloud gaming client.

In some embodiments, the data acquisition module 20 further includes: the second coding thread running unit 209, the second audio coding unit 210, the second video coding unit 211 and the coded stream forwarding unit 212. The cloud server is configured to run the game process, the media coding process and a media transmission process. The media transmission process is run in an auxiliary virtual container independent of the cloud virtual container.

The second coding thread running unit 209 is configured to run a second coding thread associated with the media coding process in the cloud virtual container.

The second audio coding unit 210 is configured to acquire a cloud livestreaming coding standard indicated by the second coding thread, and perform audio coding on the game audio data associated with the second frame rate based on the cloud livestreaming coding standard to obtain a second audio coded stream of the target cloud gaming.

The second video coding unit 211 is configured to perform video coding on the game image data associated with the first frame rate based on the cloud livestreaming coding standard to obtain a second video coded stream of the target cloud gaining.

The coding stream forwarding unit 212 is configured to take the second audio coded stream and the second video coded stream as a to-be-processed coded stream of the target cloud gaming, and forward the to-be-processed coded stream to the media transmission process such that the media transmission process notifies the mixing module 30 to execute the operation of mixing, in response to acquiring audio data of a livestreamer object transmitted by the cloud gaming client, the game audio data and the audio data to obtain mixed audio data in the auxiliary cloud virtual container based on the to-be-processed coded stream.

In some embodiments, the mixing module 30 includes: an audio decoding unit 301, a reference audio frame acquisition unit 302 and a mixing unit 303.

The audio decoding unit 301 is configured to decode, in response to acquiring the audio data of the livestreamer object transmitted by the cloud gaming client, the audio data to obtain a audio frame of the livestreamer object and a recording timestamp of the audio frame.

The reference audio frame acquisition unit 302 is configured to acquire the audio frame in the game audio data based on the second collection time interval corresponding to the game audio data, take the acquired audio frame as a reference audio frame, and determine a mixing timestamp of the reference audio frame according to a collected audio timestamp corresponding to the game audio data.

The mixing unit 303 is configured to adjust the recording timestamp based on the mixing timestamp, mix the reference audio frame and the audio frame based on the adjusted recording timestamp to obtain a mixed audio frame corresponding to the mixing timestamp consistent with the collection timestamp, and take the obtained mixed audio frame and the mixing timestamp corresponding to the mixed audio frame as the mixed audio data of the target cloud gaming.

In some embodiments, the mixing module 30 further includes: an audio frame counting unit 304 and a volume adjustment unit 305.

The audio frame counting unit 304 is configured to count the number of the acquired audio frames, and characterize, when the number of the audio frames is M and M is a non-zero positive integer, the number of times of mixing to be performed with M.

The volume adjustment unit 305 is configured to enhance, in executing the operation of adjusting the recording timestamp based on the mixing timestamp, mixing the reference audio frame and the audio frame based on the adjusted recording timestamp, the volume of the audio frame based on the number of times of mixing to be performed, and reduce the volume of the reference audio frame.

In some embodiments, the mixing module 30 further includes: a null detection unit 306.

The null detection unit 306 is configured to skip, when the number of the audio frames is null or the number of the audio frames is null, mixing the reference audio frame and the audio frame.

In some embodiments, the cloud server includes a media forwarding process started based on the cloud gaming livestreaming request. The media forwarding process is used for keeping the livestreaming service connection between the cloud server and the livestreaming server. The livestream delivery module 40 includes: an audio sorting unit 401, an image sorting unit 402, a data packet acquisition unit 403 and a packetizing and delivering unit 404.

The audio sorting unit 401 is configured to acquire the mixed audio data, acquire mixed audio frames and the audio collection timestamps corresponding to the mixed audio frames from the mixed audio data, sort the mixed audio frames based on the audio collection timestamps, and write the sorted mixed audio frames into an audio cache queue associated with the media forwarding process.

The image sorting unit 402 is configured to acquire the game image data, acquire image frames and the image collection timestamps corresponding to the image frames from the game image data, sort the image frames based on the image collection timestamps, and write the sorted image frames into a video cache queue associated with the media forwarding process.

The data packet acquisition unit 403 is configured to acquire a smooth acquisition thread associated with the media forwarding process, acquire a video data packet matched with a first frame rate indicated by a first collection time interval from the video cache queue through the smooth acquisition thread, and acquire an audio data packet matched with a second frame rate indicated by a second collection time interval from the audio cache queue through the smooth acquisition thread.

The packetizing and delivering unit 404 is configured to packetize the video data packet and the audio data packet to obtain the livestreaming data stream corresponding to the target cloud gaining, and deliver the livestreaming data stream to the livestreaming client associated with the cloud gaming client through the livestreaming server.

In some embodiments, the data packet acquisition unit 403 includes: a time interval acquisition subunit 4031, a video frame acquisition subunit 4032 and an audio frame acquisition subunit 4033.

The time interval acquisition subunit 4031 is configured to acquire the smooth acquisition thread associated with the media forwarding process, acquire a data collection component having a same collection time interval as the smooth acquisition thread, and determine the first collection time interval associated with the game image data and the second collection time interval associated with the game audio data based on the collection time interval of the data collection component.

The video frame acquisition subunit 4032 is configured to determine a smooth video acquisition timestamp matched with the first collection time interval through the smooth acquisition thread, acquire a cached video frame with an image collection timestamp smaller than the smooth video acquisition timestamp from the video cache queue, and encapsulate the acquired cached video frame and the image collection timestamp corresponding to the cached video frame to obtain the video data packet matched the first frame rate indicated by the first collection time interval.

The audio frame acquisition subunit 4033 is configured to determine a smooth audio acquisition timestamp matched with the second collection time interval through the smooth acquisition thread, acquire a cached audio frame with an audio collection timestamp smaller than the smooth audio acquisition timestamp from the audio cache queue, and encapsulate the acquired cached audio frame and the audio collection timestamp corresponding to the cached audio frame to obtain the audio data packet matched the second frame rate indicated by the second collection time interval.

In some embodiments, the livestream delivery module 40 further includes: an auxiliary packet acquisition unit 405, an audio packet discarding unit 406 and a video packet discarding unit 407.

After the livestream delivery module 40 delivers the livestreaming data stream to the livestreaming client associated with the cloud gaming client through the livestreaming server, the auxiliary packet acquisition unit 405 is configured to determine a maximum audio collection timestamp of the livestreaming data stream.

The audio packet discarding unit 406 is configured to discard, when an audio collection timestamp of a to-be-transmitted audio data packet recorded through the smooth acquisition thread is smaller than the maximum audio collection timestamp, the to-be-transmitted audio data packet. The to-be-transmitted audio data packet refers to a next audio data packet to be transmitted to the livestreaming server.

In some embodiments, the livestream delivery module 40 further includes: the video packet discarding unit 407. After the livestream delivery module 40 delivers the livestreaming data stream to the livestreaming client associated with the cloud gaming client through the livestreaming server, the auxiliary packet acquisition unit 405 is further configured to determine a maximum image collection timestamp of the livestreaming data stream.

Figure 11:
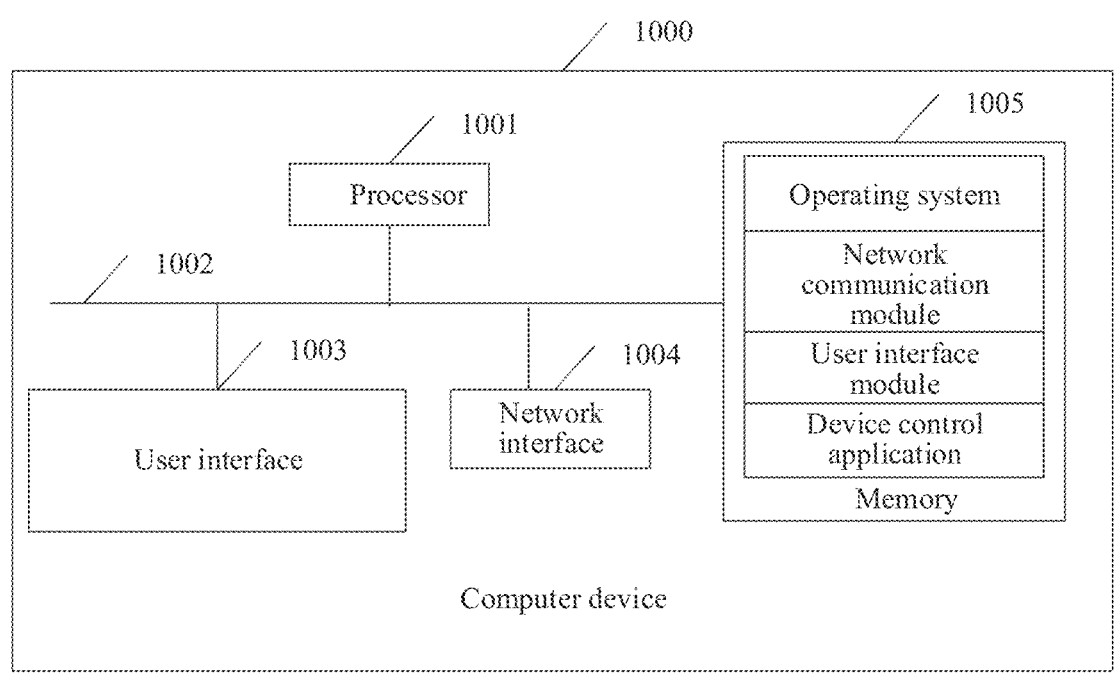
FIG. 11 is a schematic structural diagram of a computer device according to an embodiment of this application.

The video packet discarding unit 407 is configured to discard, when a video collection timestamp of a to-be-transmitted video data packet recorded through the smooth acquisition thread is smaller than the maximum video collection timestamp, the to-be-transmitted video data packet. The to-be-transmitted video data packet refers to a next video data packet to be transmitted to the livestreaming server. Further, referring to FIG. 11, FIG. 11 is a schematic structural diagram of a computer device according to an embodiment of this application. As shown in FIG. 11, the computer device 1000 may be a cloud server. The cloud server may be the cloud server B in the embodiment corresponding to FIG. 2. The computer device 1000 may include: a processor 1001, a network interface 1004 and a memory 1005. Besides, the computer device 1000 may further include: a user interface 1003 and at least one communication bus 1002. The communications bus 1002 is configured to implement connection and communication between these components. In some embodiments, the user interface 1003 may further include a standard wired interface and a standard wireless interface. The network interface 1004 may optionally include a standard wired interface and a standard wireless interface (for example, a Wi-Fi interface). The memory 1005 may be a high-speed RAM memory, or a non-volatile memory, for example, at least one magnetic disk storage. In some embodiments, the memory 1005 may be at least one storage apparatus that is located far away from the foregoing processor 1001. As shown in FIG. 11, the memory 1005 used as a computer storage medium may include an operating system, a network communication module, a user interface module, and a device control application.

The network interface 1004 in the computer device 1000 may also perform a network connection with any livestreamer terminal in the livestreamer terminal cluster in the embodiment corresponding to FIG. 1. In the computer device 1000 shown in FIG. 11, the network interface 1004 may provide a network communication function. The user interface 1003 is mainly configured to provide an input interface for users. The processor 1001 may be configured to invoke a device control application stored in the memory 1005 to execute the description for the game data processing method in the embodiment corresponding to FIG. 3 or FIG. 8, or to execute the description for the game data processing apparatus 1 in the embodiment corresponding to FIG. 10.

In addition, an embodiment of this application further provides a computer storage medium. The computer storage medium stores a computer-readable instruction executed by the game data processing apparatus 1 mentioned above. The computer-readable instructions include a program instruction. When a processor executes the program instruction, the description for the game data processing method in the embodiment corresponding to FIG. 3 or FIG. 8 can be executed. As an example, the program instruction may be executed in a computing device, or in a plurality of computing devices located in one place, or in a plurality of computing devices that are distributed in a plurality of places and connected with each other through a communication network. The plurality of computing devices that are distributed in a plurality of places and connected with each other through a communication network may form a blockchain system.

This application provides a computer device, including a memory and one or more processors. The memory stores computer-readable instructions, and the computer-readable instructions, when executed by the processor, cause the one or more processors to execute the steps in the game data processing method described above.

This application provides one or more non-transitory computer-readable storage media storing computer-readable instructions. The computer-readable instructions, when executed by one or more processors, cause the one or more processors to implement the steps in the game data processing method described above.

In some embodiments, this application further provides a computer program product, including a computer-readable instruction. The computer-readable instruction, when executed by a processor, implements the steps in the method embodiments above. A processor of a computer device reads the computer instruction from the computer-readable storage medium. The processor executes the computer instruction such that the computer device executes the description for the game data processing method in the embodiment corresponding to FIG. 3 or FIG. 8.

A person of ordinary skill in the art may understand that all or some procedures in the methods in the foregoing embodiments may be implemented by a computer-readable instruction instructing relevant hardware. The program may be stored in a computer-readable storage medium. When the program is executed, the procedures of the foregoing method embodiments may be included. The storage medium may be a magnetic disc, an optical disc, a read-only memory (ROM), a random access memory (RAM), or the like.

What is disclosed above is merely exemplary embodiments of this application, and certainly is not intended to limit the scope of the claims of this application. Therefore, equivalent variations made in accordance with the claims of this application shall fall within the scope of this application.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A game data processing method performed by a computer device, the method comprising:
    establishing a livestreaming service connection between a cloud server and a livestreaming server associated with a target cloud gaming, wherein the cloud server comprises a media forwarding process for keeping the livestreaming service connection between the cloud server and the livestreaming server;
    acquiring game image data and game audio data of the target cloud gaming based on the livestreaming service connection, and an image collection timestamp corresponding to the game image data and an audio collection timestamp corresponding to the game audio data;
    acquiring audio data of a livestreamer object transmitted by a cloud gaming client of the target cloud gaming;
    mixing the game audio data and the audio data to obtain mixed audio data, a mixing timestamp corresponding to the mixed audio data being consistent with the audio collection timestamp;
    obtaining a livestreaming data stream corresponding to the target cloud gaming based on the mixed audio data, the audio collection timestamp, the game image data and the image collection timestamp, further including:
        acquiring mixed audio frames and audio collection timestamps corresponding to the mixed audio frames from the mixed audio data, sorting the mixed audio frames based on the audio collection timestamps, and writing the sorted mixed audio frames into an audio cache queue associated with the media forwarding process;
        acquiring image frames and image collection timestamps corresponding to the image frames from the game image data, sorting the image frames based on the image collection timestamps, and writing the sorted image frames into a video cache queue associated with the media forwarding process;
        acquiring a smooth acquisition thread associated with the media forwarding process, acquiring a video data packet matched with a first frame rate indicated by a first collection time interval from the video cache queue through the smooth acquisition thread and an audio data packet matched with a second frame rate indicated by a second collection time interval from the audio cache queue through the smooth acquisition thread; and packetizing the video data packet and the audio data packet to obtain the livestreaming data stream corresponding to the target cloud gaming; and delivering the livestreaming data stream to a livestreaming client associated with the cloud gaming client through the livestreaming server.

2. The method according to claim 1, wherein the method further comprises:

acquiring a game access request transmitted for the target cloud gaming by the cloud gaming client;

performing authentication processing on a game start identifier corresponding to the cloud gaming client based on the game access request to obtain an authentication result corresponding to the game start identifier;

when the authentication result indicates that the cloud gaming client has permission to access the target cloud gaming through the game start identifier, establishing a game service connection between the cloud server and the cloud gaming client;

configuring a cloud virtual container for running the target cloud gaming based on the game service connection; and starting a game process of the target cloud gaming in the cloud virtual container, and running the target cloud gaming through the game process.

3. The method according to claim 1, wherein a game display interface corresponding to the cloud gaming client comprises a livestreaming indication control for performing cloud gaming livestreaming by the livestreamer object; and the livestreaming service connection between the cloud server and the livestreaming server associated with the target cloud gaming is established in response to a trigger operation executed by the livestreamer object on the livestreaming indication control.

4. The method according to claim 1, wherein the establishing a livestreaming service connection between a cloud server and a livestreaming server associated with a target cloud gaming comprises:

transmitting a livestreaming authentication request to the livestreaming server associated with the target cloud gaming based on a game start identifier corresponding to the cloud gaming client, wherein the livestreaming server configures a livestream pushing address for livestreaming the target cloud gaming for the cloud gaming client based on the livestreaming authentication request; and receiving the livestream pushing address returned by the livestreaming server, and triggering the establishment of the livestreaming service connection between the cloud server and the livestreaming server after returning the livestream pushing address to the cloud gaming client.

5. The method according to claim 1, wherein the target cloud gaming is run by a game process in a cloud virtual container; and the acquiring game image data and game audio data of the target cloud gaming based on the livestreaming service connection, and an image collection timestamp corresponding to the game image data and an audio collection timestamp corresponding to the game audio data comprises:

starting, based on the livestreaming service connection, a media coding process associated with the game process in the cloud virtual container;

capturing background audio frame data and game video frame data associated with the target cloud gaming, and storing the captured background audio frame data and the game video frame data in a cloud cache space;

collecting an image frame matched with a first frame rate indicated by a first collection time interval from the game video frame data as the game image data of the target cloud gaming, and recording the image collection timestamp corresponding to the game image data; and collecting an audio frame matched with a second frame rate indicated by a second collection time interval from the background audio frame data as the game audio data of the target cloud gaming, and recording the audio collection timestamp corresponding to the game audio data.

6. The method according to claim 1, wherein the mixing the game audio data and the audio data to obtain mixed audio data, a mixing timestamp corresponding to the mixed audio data being consistent with the audio collection timestamp comprises:

decoding the audio data to obtain an audio frame of the livestreamer object and a recording timestamp of the audio frame;

acquiring an audio frame in the game audio data as a reference audio frame, and determining a mixing timestamp of the reference audio frame according to a collected audio timestamp corresponding to the game audio data; and mixing the reference audio frame and the audio frame based on the recording timestamp to obtain a mixed audio frame corresponding to the mixing timestamp consistent with the collection timestamp, and taking the obtained mixed audio frame and the mixing timestamp corresponding to the mixed audio frame as the mixed audio data of the target cloud gaming.

7. A computer device, comprising a memory and one or more processors, the memory storing computer-readable instructions, and the computer-readable instructions, when executed by the processor, causing the computer device to perform a game data processing method including:

establishing a livestreaming service connection between a cloud server and a livestreaming server associated with a target cloud gaming, wherein the cloud server comprises a media forwarding process for keeping the livestreaming service connection between the cloud server and the livestreaming server;

acquiring game image data and game audio data of the target cloud gaming based on the livestreaming service connection, and an image collection timestamp corresponding to the game image data and an audio collection timestamp corresponding to the game audio data;

acquiring audio data of a livestreamer object transmitted by a cloud gaming client of the target cloud gaming;

mixing the game audio data and the audio data to obtain mixed audio data, a mixing timestamp corresponding to the mixed audio data being consistent with the audio collection timestamp;

obtaining a livestreaming data stream corresponding to the target cloud gaming based on the mixed audio data, the audio collection timestamp, the game image data and the image collection timestamp, further including:
  acquiring mixed audio frames and audio collection timestamps corresponding to the mixed audio frames from the mixed audio data, sorting the mixed audio frames based on the audio collection timestamps, and writing the sorted mixed audio frames into an audio cache queue associated with the media forwarding process;
  acquiring image frames and image collection timestamps corresponding to the image frames from the game image data, sorting the image frames based on the image collection timestamps, and writing the sorted image frames into a video cache queue associated with the media forwarding process;
  acquiring a smooth acquisition thread associated with the media forwarding process, acquiring a video data packet matched with a first frame rate indicated by a first collection time interval from the video cache queue through the smooth acquisition thread and an audio data packet matched with a second frame rate indicated by a second collection time interval from the audio cache queue through the smooth acquisition thread; and
  packetizing the video data packet and the audio data packet to obtain the livestreaming data stream corresponding to the target cloud gaming; and
  delivering the livestreaming data stream to a livestreaming client associated with the cloud gaming client through the livestreaming server.

8. The computer device according to claim 7, wherein the method further comprises:
  acquiring a game access request transmitted for the target cloud gaming by the cloud gaming client;
  performing authentication processing on a game start identifier corresponding to the cloud gaming client based on the game access request to obtain an authentication result corresponding to the game start identifier;
  when the authentication result indicates that the cloud gaming client has permission to access the target cloud gaming through the game start identifier, establishing a game service connection between the cloud server and the cloud gaming client;
  configuring a cloud virtual container for running the target cloud gaming based on the game service connection; and
  starting a game process of the target cloud gaming in the cloud virtual container, and running the target cloud gaming through the game process.

9. The computer device according to claim 7, wherein a game display interface corresponding to the cloud gaming client comprises a livestreaming indication control for performing cloud gaming livestreaming by the livestreamer object; and
  the livestreaming service connection between the cloud server and the livestreaming server associated with the target cloud gaming is established in response to a trigger operation executed by the livestreamer object on the livestreaming indication control.

10. The computer device according to claim 7, wherein the establishing a livestreaming service connection between a cloud server and a livestreaming server associated with a target cloud gaming comprises:
  transmitting a livestreaming authentication request to the livestreaming server associated with the target cloud gaming based on a game start identifier corresponding to the cloud gaming client, wherein the livestreaming server configures a livestream pushing address for livestreaming the target cloud gaming for the cloud gaming client based on the livestreaming authentication request; and
  receiving the livestream pushing address returned by the livestreaming server, and triggering the establishment of the livestreaming service connection between the cloud server and the livestreaming server after returning the livestream pushing address to the cloud gaming client.

11. The computer device according to claim 7, wherein the target cloud gaming is run by a game process in a cloud virtual container; and
  the acquiring game image data and game audio data of the target cloud gaming based on the livestreaming service connection, and an image collection timestamp corresponding to the game image data and an audio collection timestamp corresponding to the game audio data comprises:
  starting, based on the livestreaming service connection, a media coding process associated with the game process in the cloud virtual container;
  capturing background audio frame data and game video frame data associated with the target cloud gaming, and storing the captured background audio frame data and the game video frame data in a cloud cache space;
  collecting an image frame matched with a first frame rate indicated by a first collection time interval from the game video frame data as the game image data of the target cloud gaming, and recording the image collection timestamp corresponding to the game image data; and
  collecting an audio frame matched with a second frame rate indicated by a second collection time interval from the background audio frame data as the game audio data of the target cloud gaming, and recording the audio collection timestamp corresponding to the game audio data.

12. The computer device according to claim 7, wherein the mixing the game audio data and the audio data to obtain mixed audio data, a mixing timestamp corresponding to the mixed audio data being consistent with the audio collection timestamp comprises:
  decoding the audio data to obtain an audio frame of the livestreamer object and a recording timestamp of the audio frame;
  acquiring an audio frame in the game audio data as a reference audio frame, and determining a mixing timestamp of the reference audio frame according to a collected audio timestamp corresponding to the game audio data; and
  mixing the reference audio frame and the audio frame based on the recording timestamp to obtain a mixed audio frame corresponding to the mixing timestamp consistent with the collection timestamp, and taking the obtained mixed audio frame and the mixing timestamp corresponding to the mixed audio frame as the mixed audio data of the target cloud gaming.

13. One or more non-transitory computer-readable storage media storing computer-readable instructions, the computer-readable instructions, when executed by one or more processors of a computer device, causing the computer device to perform a game data processing method including:
  establishing a livestreaming service connection between a cloud server and a livestreaming server associated with a target cloud gaming, wherein the cloud server comprises a media forwarding process for keeping the livestreaming service connection between the cloud server and the livestreaming server;

acquiring game image data and game audio data of the target cloud gaming based on the livestreaming service connection, and an image collection timestamp corresponding to the game image data and an audio collection timestamp corresponding to the game audio data;

acquiring audio data of a livestreamer object transmitted by a cloud gaming client of the target cloud gaming;

mixing the game audio data and the audio data to obtain mixed audio data, a mixing timestamp corresponding to the mixed audio data being consistent with the audio collection timestamp;

obtaining a livestreaming data stream corresponding to the target cloud gaming based on the mixed audio data, the audio collection timestamp, the game image data and the image collection timestamp, further including:

acquiring mixed audio frames and audio collection timestamps corresponding to the mixed audio frames from the mixed audio data, sorting the mixed audio frames based on the audio collection timestamps, and writing the sorted mixed audio frames into an audio cache queue associated with the media forwarding process;

acquiring image frames and image collection timestamps corresponding to the image frames from the game image data, sorting the image frames based on the image collection timestamps, and writing the sorted image frames into a video cache queue associated with the media forwarding process;

acquiring a smooth acquisition thread associated with the media forwarding process, acquiring a video data packet matched with a first frame rate indicated by a first collection time interval from the video cache queue through the smooth acquisition thread and an audio data packet matched with a second frame rate indicated by a second collection time interval from the audio cache queue through the smooth acquisition thread; and packetizing the video data packet and the audio data packet to obtain the livestreaming data stream corresponding to the target cloud gaming; and delivering the livestreaming data stream to a livestreaming client associated with the cloud gaming client through the livestreaming server.

14. The non-transitory computer-readable storage media according to claim 13, wherein the method further comprises:

acquiring a game access request transmitted for the target cloud gaming by the cloud gaming client;

performing authentication processing on a game start identifier corresponding to the cloud gaming client based on the game access request to obtain an authentication result corresponding to the game start identifier;

when the authentication result indicates that the cloud gaming client has permission to access the target cloud gaming through the game start identifier, establishing a game service connection between the cloud server and the cloud gaming client;

configuring a cloud virtual container for running the target cloud gaming based on the game service connection; and starting a game process of the target cloud gaming in the cloud virtual container, and running the target cloud gaming through the game process.

15. The non-transitory computer-readable storage media according to claim 13, wherein a game display interface corresponding to the cloud gaming client comprises a livestreaming indication control for performing cloud gaming livestreaming by the livestreamer object; and the livestreaming service connection between the cloud server and the livestreaming server associated with the target cloud gaming is established in response to a trigger operation executed by the livestreamer object on the livestreaming indication control.

16. The non-transitory computer-readable storage media according to claim 13, wherein the establishing a livestreaming service connection between a cloud server and a livestreaming server associated with a target cloud gaming comprises:

transmitting a livestreaming authentication request to the livestreaming server associated with the target cloud gaming based on a game start identifier corresponding to the cloud gaming client, wherein the livestreaming server configures a livestream pushing address for livestreaming the target cloud gaming for the cloud gaming client based on the livestreaming authentication request; and receiving the livestream pushing address returned by the livestreaming server, and triggering the establishment of the livestreaming service connection between the cloud server and the livestreaming server after returning the livestream pushing address to the cloud gaming client.

17. The non-transitory computer-readable storage media according to claim 13, wherein the target cloud gaming is run by a game process in a cloud virtual container; and the acquiring game image data and game audio data of the target cloud gaming based on the livestreaming service connection, and an image collection timestamp corresponding to the game image data and an audio collection timestamp corresponding to the game audio data comprises:

starting, based on the livestreaming service connection, a media coding process associated with the game process in the cloud virtual container;

capturing background audio frame data and game video frame data associated with the target cloud gaming, and storing the captured background audio frame data and the game video frame data in a cloud cache space;

collecting an image frame matched with a first frame rate indicated by a first collection time interval from the game video frame data as the game image data of the target cloud gaming, and recording the image collection timestamp corresponding to the game image data; and collecting an audio frame matched with a second frame rate indicated by a second collection time interval from the background audio frame data as the game audio data of the target cloud gaming, and recording the audio collection timestamp corresponding to the game audio data.

18. The non-transitory computer-readable storage media according to claim 13, wherein the mixing the game audio data and the audio data to obtain mixed audio data, a mixing timestamp corresponding to the mixed audio data being consistent with the audio collection timestamp comprises:

decoding the audio data to obtain an audio frame of the livestreamer object and a recording timestamp of the audio frame;

acquiring an audio frame in the game audio data as a reference audio frame, and determining a mixing timestamp of the reference audio frame according to a collected audio timestamp corresponding to the game audio data; and mixing the reference audio frame and the audio frame based on the recording timestamp to obtain a mixed audio frame corresponding to the mixing timestamp consistent with the collection timestamp, and taking the obtained mixed audio frame and the mixing timestamp corresponding to the mixed audio frame as the mixed audio data of the target cloud gaming.

* * * * *